United States Patent
Gleasman et al.

(10) Patent No.: US 7,632,188 B2
(45) Date of Patent: Dec. 15, 2009

(54) SPHERICAL UNIVERSAL COUPLING

(75) Inventors: Keith E. Gleasman, Fairport, NY (US); Paul W. Suwijn, Pittsford, NY (US)

(73) Assignee: Torvec, Inc., Rochester, NY (US)

( * ) Notice: Subject to any disclaimer, the term of this patent is extended or adjusted under 35 U.S.C. 154(b) by 0 days.

(21) Appl. No.: 11/924,130

(22) Filed: Oct. 25, 2007

(65) Prior Publication Data
US 2008/0102967 A1    May 1, 2008

Related U.S. Application Data

(63) Continuation-in-part of application No. 11/553,736, filed on Oct. 27, 2006.

(51) Int. Cl.
*F16D 3/18* (2006.01)
(52) U.S. Cl. .................................. 464/73; 464/904
(58) Field of Classification Search ................. 464/109, 464/118, 125, 128, 154, 156, 904, 905
See application file for complete search history.

(56) References Cited

U.S. PATENT DOCUMENTS

| | | | |
|---|---|---|---|
| 1,770,743 A | | 7/1930 | Morgan |
| 1,841,418 A | | 1/1932 | Scott |
| 2,430,683 A | | 11/1947 | O'Malley |
| 2,453,279 A | * | 11/1948 | Starbuck |
| 2,496,702 A | | 2/1950 | Dykman et al. |
| 2,513,758 A | | 7/1950 | Talbot |
| 2,682,760 A | * | 7/1954 | Shenk ................. 464/154 |
| 2,737,900 A | | 4/1956 | Smith |
| 2,777,306 A | * | 1/1957 | Wildhaber .............. 464/905 |
| 2,893,222 A | | 7/1959 | Albedyhl et al. |
| 2,924,954 A | | 2/1960 | Panhard |
| 3,142,972 A | | 8/1964 | Spaulding, Jr. |
| 3,292,390 A | * | 12/1966 | Wildhaber |
| 3,359,757 A | | 12/1967 | Adams |
| 3,977,267 A | | 8/1976 | Graafsma |
| 4,003,218 A | | 1/1977 | Filderman |
| 4,018,062 A | | 4/1977 | Bulliot |
| 4,133,189 A | * | 1/1979 | Rineer |
| 4,152,946 A | | 5/1979 | Kemper |
| 4,281,942 A | | 8/1981 | Gaeckle et al. |
| 4,305,596 A | | 12/1981 | Unterstrasser |
| 4,370,869 A | * | 2/1983 | Jonassen ................. 464/156 |
| 4,449,956 A | * | 5/1984 | Ueno ...................... 464/904 |

(Continued)

OTHER PUBLICATIONS

H.CHR.Seherr-Thoss, F.Schmelz, E.Aucktor; Universal Joints and Driveshafts; pp. 17,36-37.

*Primary Examiner*—Greg Binda
*Assistant Examiner*—Clifford J Louden
(74) *Attorney, Agent, or Firm*—Brown & Michaels, PC

(57) ABSTRACT

A pair of spherical gears connects the intersecting shafts of a CV-joint. One gear has internal teeth, and the other has external teeth. The gear design is based on pitch circles that are great circles on theoretical pitch spheres that are concentric and have identical radii. The internal teeth are either conically or spherically shaped, while the external tooth faces are cylindrical with tangential flat extensions. The spherical gears are shown on half-shafts. The preferred embodiments have six teeth on each gear, and one preferred embodiment also uses balls for the internal teeth. The gears, while rotating at high speeds under load, can intersect throughout a continuous maximum range of 60° or more in any direction.

31 Claims, 16 Drawing Sheets

U.S. PATENT DOCUMENTS

| | | | |
|---|---|---|---|
| 4,498,888 A * | 2/1985 | Pastor | |
| 4,609,364 A * | 9/1986 | Labbe | |
| 4,624,175 A | 11/1986 | Wahlmark | |
| 4,639,200 A | 1/1987 | Baumgardner et al. | |
| 4,840,601 A * | 6/1989 | Denman | |
| 5,513,553 A | 5/1996 | Gleasman et al. | |
| 5,613,914 A | 3/1997 | Gleasman et al. | |
| 5,878,492 A | 3/1999 | Gleasman et al. | |
| 6,120,381 A * | 9/2000 | Orain et al. | 464/905 |
| 6,443,844 B1 | 9/2002 | Perrow | |
| 7,004,842 B2 | 2/2006 | Fairchild et al. | |

\* cited by examiner

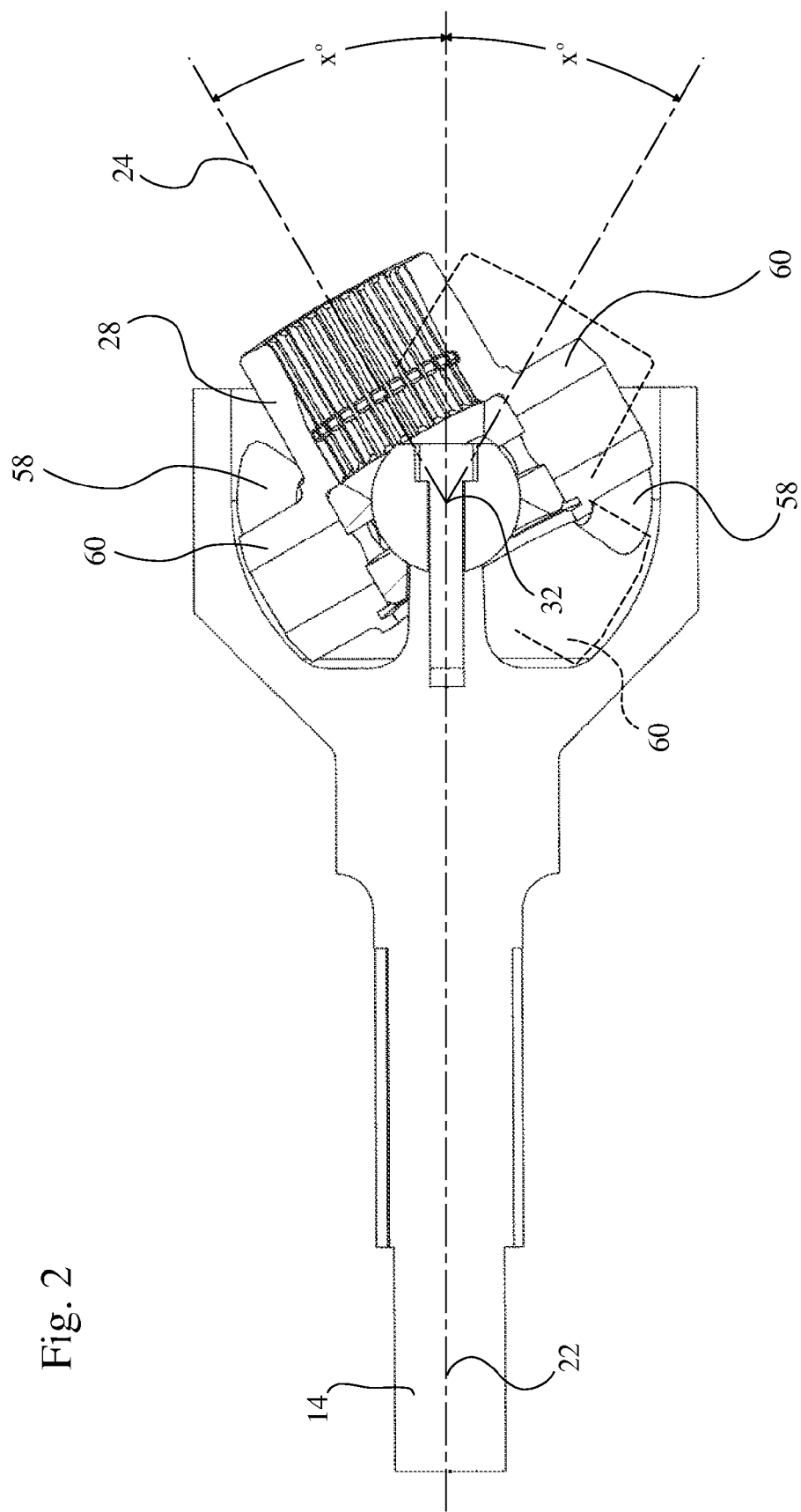

| | -30° | -18° | -12° | -6° | 0° | 6° | 12° | 18° | 30° |
|---|---|---|---|---|---|---|---|---|---|
| I | ◿ | ◿ | ▽ | ▽ | ▽ | ▽ | ▽ | ◺ | ◺ |
| E | ▯ | ▯ | ▯ | ▯ | ▯ | ▯ | ▯ | ▯ | ▯ |

SPHERICAL UNIVERSAL COUPLING

REFERENCE TO RELATED APPLICATIONS

This is a continuation-in-part patent application of copending application Ser. No. 11/553,736, filed Oct. 27, 2006, entitled "SPHERICAL UNIVERSAL COUPLING". The aforementioned application is hereby incorporated herein by reference.

BACKGROUND OF THE INVENTION

1. Field of the Invention

The invention relates to universal couplings and automotive half-shafts, and more particularly, to constant-velocity universal joints for directly connecting two shafts in a manner that transmits rotation from the driving shaft to the driven shaft while, at the same time, permitting the angle of intersection between the axes of the shafts to be varied away from 180° alignment in any direction over a relatively wide and continuous range of angles (e.g., 60° or more).

2. Description of Related Art

There are well-known, non-gear means for transmitting rotary motion between shafts experiencing angular change. Perhaps the best known of such devices are the universal joints used to connect the drive shafts and wheel axles of automotive vehicles. Such universal joints are often constructed in the venerable double-yoke (Cardan) form of two small intersecting axles interconnected by a pair of yokes. However, the shafts connected by such yoke and axle joints do not turn at the same rate of rotation throughout each entire revolution. Therefore, constant velocity ("CV") joints have been developed (e.g., Rzeppa and Birfield), in which the points of connection between the angled shafts are provided by sliding balls, which, during each revolution of the driving and driven shafts, slide back and forth in individual tracks to maintain their respective centers at all times in a plane which bisects the instantaneous angle formed between the shafts. However, such universal and CV-joints are quite complex and relatively difficult to lubricate, and the design and manufacture of such joint components is widely recognized as a very specialized and esoteric art of critical importance to the worldwide automotive industry. While this universal joint art is very well developed, the joints are expensive, including many parts that are difficult and expensive to manufacture due to large surface areas that must be ground with extreme accuracy (e.g., ±0.0002"/0.005 mm). Such joints are limited in regard to the rotational speeds that they can transmit and, more particularly, in regard to the size of the angles over which they can operate efficiently.

In the widely used Rzeppa CV-joint design, for example, with every rotation of the joint there is: (a) considerable reciprocating sliding action along both internal and external meridional (curved longitudinal) ball guide slots, as well as (b) an additional crosswise sliding action of the balls across the rectangular slots of the required spherical ball retainer; (c) sliding of the spherical inner race required by these designs against the male spherical surface of the housing cup as well as against the male spherical diameter of the slotted core element. The frequency of these sliding actions produces heat that increases in proportion to operating speeds and shaft angles. Further, the Rzeppa joint designs also necessitate camming modifications to both inner and outer meridional ball-guide slots in order to force the balls and their retainer into a constant-velocity plane position. These cam angles also guarantee that a portion of the ball motion along the slots occurs as a sliding, rather than a pure rolling, motion.

With respect to motion limitation in the existing commercial CV-joint designs, the funnel angle (or combined inner and outer cam angles) of Rzeppa meridional slots needs to be higher than 15° to avoid ball-jamming friction, and thus, respective inner and outer ball-guide slots converge and diverge rather rapidly, limiting the total angular range that can be accommodated in a reasonably-sized CV-joint assembly package.

A universal coupling using a new type of "spherical" gearing was disclosed in U.S. Pat. No. 5,613,914. That patent, and its many corresponding patents throughout the world, disclosed spherical gears having several different possible tooth forms that could be incorporated into various designs of disclosed CV-joints. This spherical gearing is based on a radically different gear geometry design. Namely, the use of a single pair of gears to transmit constant velocity between two shafts is accomplished by a design in which one of the gears has internal teeth and the other has external teeth. The pitch circles of the two gears are of identical size and always remain, in effect, as great circles on the same pitch sphere. As is axiomatic in spherical geometry, such great circles intersect at two points, and the pair of lunes formed on the surface of the sphere between the intersecting great circles (i.e., between the pitch circles of the two gears) inscribe a giant lemniscate ("figure-eight") around the surface of the sphere. Since the relative movement of the tooth contact points shared between the mating gears inscribe respective lemniscates at all relative angular adjustments of the gear shafts, the two shafts rotate at constant velocity.

Although the pitch circles of each spherical gear have just been indicated to be theoretical great circles on the same pitch sphere, it may be easier to conceptualize such spherical gearing by thinking of each gear of the pair as having its own respective theoretical pitch surface, thereby permitting the necessary relative motion between the gears. Thus, each spherical gear may also be thought of theoretically as having its own respective pitch surface in the form of a respective one of a pair of respective pitch spheres that have coincident centers and radii which are substantially identical while permitting each pitch sphere to rotate independently about its respective axis. Therefore, each pitch circle can also be considered theoretically to be, respectively, a great circle on a respective one of these substantially identical pitch spheres so that the pitch circles of the gear pair effectively intersect with each other at two points separated by 180° (i.e., "poles"), and the axes of rotation of the two respective pitch spheres intersect at the coincident centers of the two pitch spheres at all times and at all angles of intersection.

A pair of full-sized steel gears was built, and bench tested, clearly validating that spherical gearing is capable of providing substantially true constant velocity with low friction for angular connections when operating at high speeds while the angles between the shafts are continuously varying through a wide range of angles, e.g., a much wider range of angles than presently achieved by standard commercial automotive CV-joints. Unfortunately, the spherical gearing disclosed in U.S. Pat. No. 5,613,914 is fairly complex, difficult to manufacture, and lacks the practicality required for commercial CV-joint use.

Universal joints are presently used in the forms of (a) interlocking yokes (e.g., Cardan joints) to provide angular interconnections in the drive shafts of vehicles and (b) automotive half-shaft drive axles to connect the output shafts of drive differentials with the turning and bouncing drive wheels of a vehicle. A typical commercial half-shaft includes two different types of universal joints, e.g., a Rzeppa universal joint at one end and a tri-pot universal joint at the other end.

Each of these joints is complex and expensive to manufacture. The Rzeppa universal joint uses six precision ground balls that, as just indicated above, slide back and forth in a complex of respective precision ground tracks, and the tri-pot universal joint uses three precision ground spherical rollers and straight ground tracks.

SUMMARY OF THE INVENTION

A pair of spherical gears connects the intersecting shafts of a CV-joint. One gear has internal teeth, and the other has external teeth. The gear design is based on pitch circles that are great circles on theoretical pitch spheres that are concentric and have identical radii. The internal teeth are either conically or spherically shaped, while the external tooth faces are cylindrical with tangential flat extensions. The spherical gears are shown on half-shafts. The preferred embodiments have six teeth on each gear, and one preferred embodiment also uses balls for the internal teeth. The gears, while rotating at high speeds under load, can intersect throughout a continuous maximum range of 60° or more in any direction. The spherical gear design provides a practical commercial CV-joint that is lighter but stronger than existing joints, while being easier and less expensive to manufacture. A half-shaft using the spherical gear design is also disclosed.

A pair of spherical gears of the present invention function as a substantially true constant-velocity joint to connect the intersecting shafts of a vehicle drive shaft. The exterior gear has internal teeth, and the interior gear of the pair has external teeth, each having respective pitch circles that are great circles on theoretical pitch spheres that are concentric and have identical radii. However, the designs of the individual teeth of the spherical gears of the invention differs radically from the designs disclosed in above-cited U.S. Pat. No. 5,613, 914; and even the geometric construction of the spherical gearing of the present invention is different, using a plurality of individual smaller construction spheres arranged in a circle so that the points of tangency between successive smaller spheres are all positioned on the circumference of the identical pitch circles of the gears.

Each tooth face of the teeth of each gear is centered on a great circle of the respective theoretical large sphere that is the pitch sphere of each gear, and the axis of each great circle is aligned at all times with the axis of its respective intersecting drive shaft. The tooth faces of the internal teeth of the exterior gear are shaped either conically or spherically. If shaped conically, the dimensions of each cone face are constructed tangent to the pitch circle of the cone's respective smaller construction sphere; if shaped spherically, each spherical face is, preferably, provided by internal ball teeth having the same diameter as their respective individual smaller construction spheres.

Each tooth face of the teeth of the external gear has (i) a cylindrical central portion with a radius equal to one-half the normal circular thickness of its respective individual smaller construction sphere, and (ii) two respective flat face extensions that extend tangent from the central portion in accordance with a predetermined maximum angle of the continuum of angles through which the gears are desired to intersect. The preferred embodiments use only six teeth on each gear, and the gears, while rotating at high speeds under load, can intersect throughout a continuous maximum range of 60° or more. [NOTE: Persons skilled in this art will immediately appreciate that, by placing two of the spherical-gear joints disclosed herein back-to-back (like a double Cardan universal joint), constant velocity rotational motion can be transmitted by shafts intersecting throughout a continuous maximum range of 120° or more.]

In one embodiment, the invention's spherical-gear CV-joints are incorporated in an automotive half-shaft along with a small plunge adaptor on the shaft end of one of the joints. In another half-shaft embodiment, the plunge adaptor is incorporated as part of the mounting for the ball-tooth gears of one of the couplings. In comparison with existing commercial half-shaft assemblies, both embodiments (a) significantly reduce sliding action and the associated heat and wear caused by such sliding, (b) eliminate the need to grind very difficult internal curvilinear or skewed grooves in the CV-housing cups, (c) eliminate the need for separate ball retainers with their difficult internal and external spherical grinds as well as precise ball-slot grinding, and (d) thus also eliminate the need for cam-action slot modifications to position a separate ball retainer properly. The intermediary function of the ball retainer and ball set of present commercial CV-joints, used as a motion-transmission link between female slot sets, is replaced by a direct-driven male/female geometry with favorable rolling action between elements.

Further, each of the invention's half-shaft embodiments uses spherical-gear elements of common design in both the non-plunging outer and the plunging inner CV-joint subassemblies, reducing inventory, production, and assembly complexity and costs.

The constant velocity joints disclosed herein transmit rotation from a driving shaft to a driven shaft while the shafts intersect at varying angle, e.g., for transmitting driving torque between an automotive engine shaft and a vehicle's drive wheels, or for reducing tangential loads on engine pistons by connecting the piston rods with the output shaft of an automotive engine, etc.

BRIEF DESCRIPTION OF THE DRAWINGS

FIG. 2 is a second view of the CV-joint of FIG. 1 showing the respective axle shafts intersecting at a predetermined maximum angle x° away from 180° alignment (the drawing showing the shafts intersecting at 30°) thereby providing angular movement throughout an overall continuum of 2x° in all directions (60°).

DETAILED DESCRIPTION OF THE INVENTION

Spherical Gear Design

Figure 1:
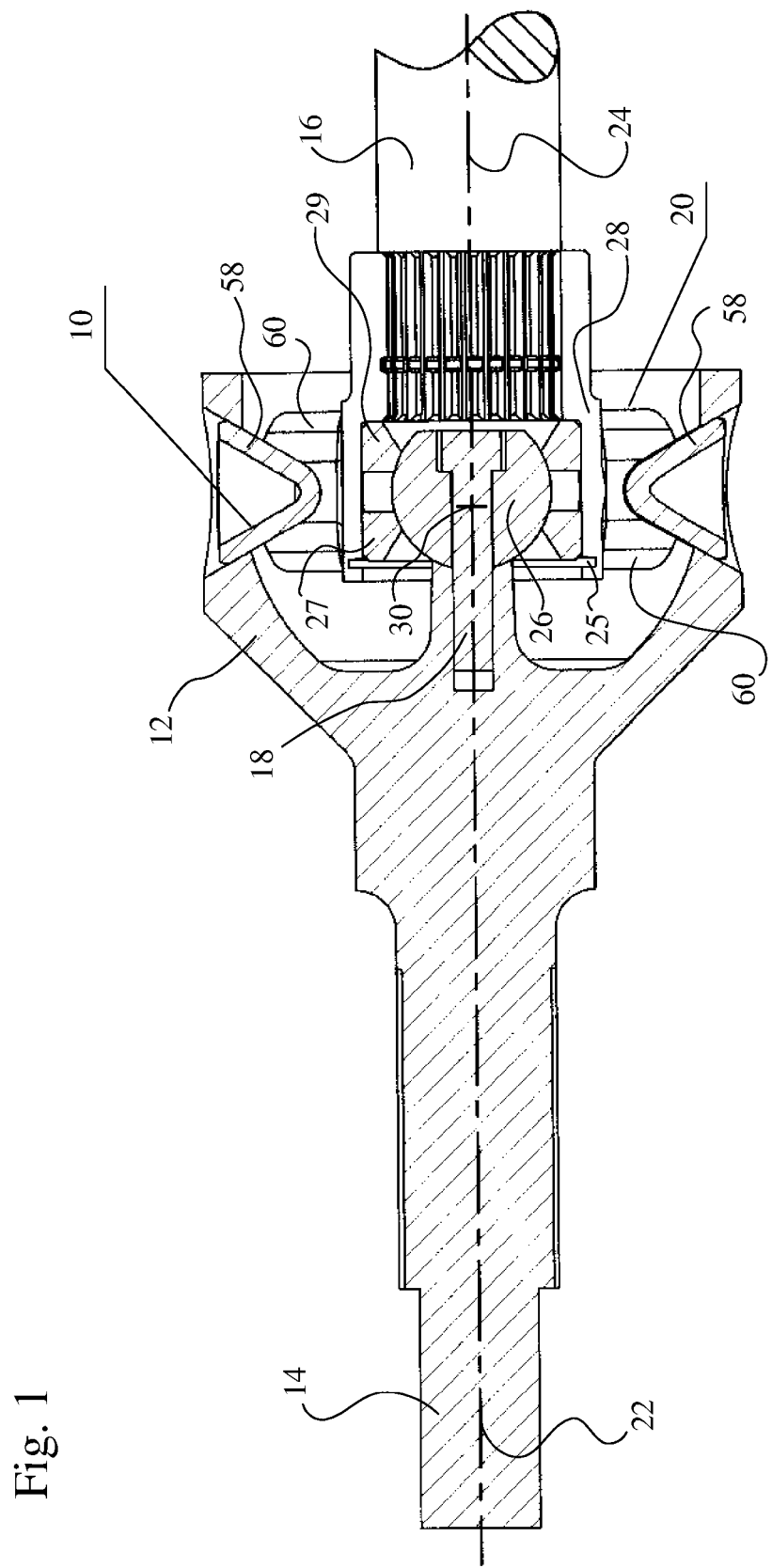
FIG. 1 is a schematic and partially cross sectional view of a spherical-gear CV-joint according to the invention with the respective axle shafts shown with their axes in 180° alignment.

FIG. 1 and FIG. 2 illustrate a constant-velocity universal joint using spherical gears for interconnecting a pair of rotating shafts. FIG. 1 is a schematic and partially cross sectional view of an exterior gear 10 (with internal teeth 58) fixed within a cup-like support 12 having one end fixed to a first shaft 14. A mating interior gear 20 (with external teeth 60) is fixed for rotation to a second shaft 16. In FIG. 1, shafts 14 and 16 are shown with their respective axes 22, 24 positioned in 180° alignment. Axes 22, 24 are also the respective axes of mating spherical gears 10, 20.

A spherical bearing maintains the mating gears 10 and 20 in proper meshing relationship. In this embodiment, this spherical bearing includes (a) an interior member, preferably a centering ball 26, fixed to the base of cup-like support 12 by a bolt 18, and (b) an exterior member in the form of a hub 28 formed on the interior of gear 20. The exterior member includes two spherical rings 27 and 29 that capture centering ball 26 and are held within hub 28 by a C-clip 25. The center point 30 of the identical theoretical pitch spheres of each gear 10, 20 is indicated within interior member 26 of the spherical bearing, and the axes 22, 24 each pass through center point 30.

FIG. 2 shows the same spherical gear arrangement shown in FIG. 1 with shaft 16 omitted. However, in FIG. 2 the axes 22, 24 of shafts 14 and 16, respectively, are shown intersecting at x°, namely, at some predetermined maximum shaft angle x° up to which the shaft axes may variably intersect while rotational forces are being transmitted. In the embodiment illustrated in FIG. 2, the predetermined maximum shaft angle x° is 30° from 180° alignment and, therefore, the illustrated spherical gear pair is designed to transmit rotational forces throughout a continuous range of angular intersection between the shafts up to 2x° in all directions (i.e., in this preferred embodiment throughout a range up to 60°).

The external teeth 60 of gear 20 are shown in solid lines pivoted about a pivot axis 32 that passes through center point 30 (see FIG. 1) at the intersection of axes 22, 24. Gear 20 is pivoted relative to gear 10 at an angle x° (30° in this embodiment) in a first direction, and an external tooth 60 of gear 20 is also shown in phantom lines pivoted about axis 32 at an angle x° in the opposite direction, providing a full range of motion of 2x° (60° in this embodiment) in all directions.

This illustrates the wide angular range of intersection through which the gear pair may be variably pivoted while rotational forces are being satisfactorily transmitted. At all times during such variable angular relative motion between the shaft axes, gears 10 and 20 remain in mesh at two respective meshing areas, the center of each meshing area being located at one of the two respective points at which the gears' pitch circles intersect with pivot axis 32, as will be explained further below.

In the CV-joint arrangement shown in FIGS. 1 and 2, spherical gears 10, 20 function in a manner similar to known gear couplings in that they do not rotate relative to each other as their respective shafts rotate at a 1:1 ratio. However, whenever the angular orientation of their respective shafts is variably adjusted out of 180° alignment (as shown in FIG. 2), the teeth of the gears continuously move into and out of mesh at two respective meshing points even though the gears rotate at all times at the same speed. This will also be explained further below.

Figure 3A:
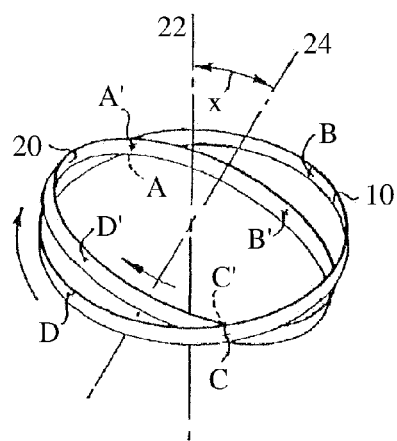
FIG. 3A illustrates schematically the relative positions of sets of tooth contact points at a first position on the theoretical spherical pitch surfaces of a pair of rotating spherical gears arranged in the manner generally indicated in FIG. 2.
Figure 3B:
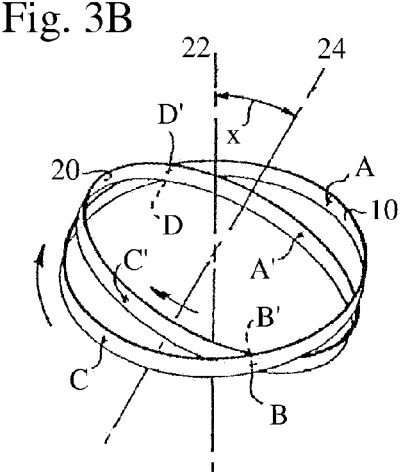
FIG. 3B illustrates schematically the sets of tooth contact points at a second position a quarter rotation past the position of FIG. 3A.
Figure 3C:
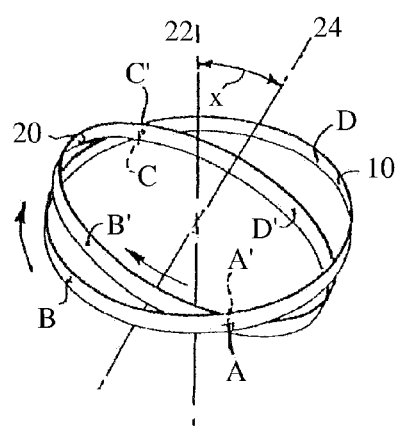
FIG. 3C illustrates schematically the sets of tooth contact points at a third position a quarter rotation past the position of FIG. 3A.

This relative movement of the teeth of gears 10, 20, into and out of mesh, is shown schematically in FIGS. 3A, 3B, and 3C which represent, respectively, three different positions of relative gear rotation about axes 22, 24 when axes 22, 24 are intersecting at a predetermined maximum angle of x°. FIGS. 3A, 3B, and 3C show the relative advancement of four different respective sets of tooth contact points as the mating gear teeth move into and out of mesh.

In FIG. 3A, a tooth contact point A on internal gear 10 is in mesh with tooth contact point A' on external gear 20; simultaneously, a tooth contact point C on internal gear 10 is in mesh with a tooth contact point C' on external gear 20. FIG. 3B shows the same tooth contact points on each gear after the gears have rotated at 1:1 for a quarter of a rotation, the gear tooth contact points D and B of gear 10 and points D' and B' of gear 20 now being in meshing contact. Following a further quarter turn, as shown in FIG. 3C, tooth contact points A, A' and C, C' once again mesh, but at a relative position 180° from their initial contact position shown in FIG. 3A.

Figure 4:
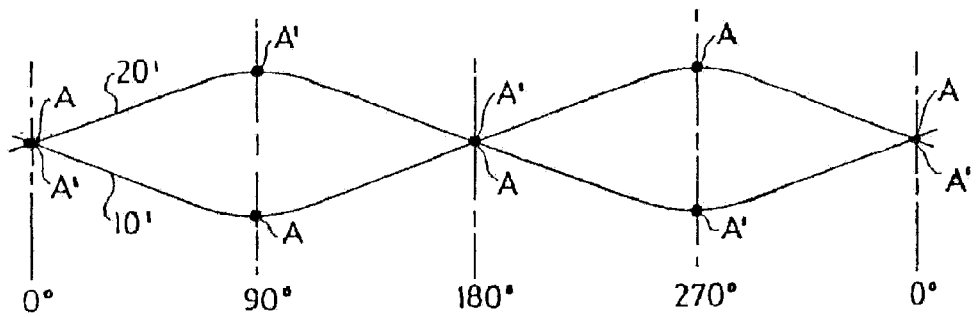
FIG. 4 is a graphic-type representation of the relative motion between one of the sets of tooth contact points illustrated in FIGS. 3A, 3B, and 3C.

The tooth contact points represented in FIGS. 3A, 3B, and 3C are all located on the pitch circles of their respective gears; and these pitch circles are each great circles on, in theoretical effect, the same sphere (see Background above). Geometrically, all great circles intersect each other at two positions 180° apart. In describing the motion of spherical gears, these intersection points are referred to as "poles". FIG. 4 is a schematic and graphic representation of the relative motion between one of the respective sets of tooth contact points illustrated in FIGS. 3A, 3B, and 3C. Namely, FIG. 4 traces the movement of tooth contact points A, A' along their respective pitch circles 10', 20' as gears 10, 20 make one full revolution together. Although the respective pitch circles are shown in flat projection, it can be seen that each tooth contact point traces a lemniscate-like pattern (a "figure-eight on the surface of a sphere"); as is well known in the universal joint art, such lemniscate motion is essential when transferring constant velocity between two articulated shafts.

Design of Spherical Gear Teeth

While there are other ways to determine the design parameters of gear teeth appropriate for this spherical gear system (see Background above), in a first embodiment of the present invention such design is preferably done by the following geometric construction illustrated in FIGS. 5A, 5B, 5C, and 5D:

(1) The first step in the design of spherical gear teeth disclosed herein is approached in the same manner as is well known in the gearing art. Namely, size and strength specifications for the gear pair are determined in accordance with the application expected to be performed by the gears. For instance, the preferred CV-joint gears disclosed herein are designed for use in the steering/drive axle of an automotive light truck. The addendum circle (maximum diameter) of the gears is usually limited by the physical space in which the gearing must operate, and the diametral pitch must be selected so that the chordal thickness of the teeth (i.e., the chordal thickness of each tooth along the pitch circle) is sufficient to permit the maximum expected load to be carried by the teeth in mesh. In this regard, it is essential to remember that when using a pair of spherical gears according to this invention to transmit motion, the gears are capable of handling twice the load as a conventional pair of gears of the same size. That is, since the gear pair shares two meshing areas (pole areas) centered 180° apart, it has twice as many teeth in mesh as would a conventional gear pair of the same size.

(2) In addition to the concentric pitch spheres for each gear as indicated above, the invention uses a plurality of individual smaller construction spheres. The number of smaller construction spheres is selected in accordance with the total number of teeth desired in the final gear pair, and the smaller construction spheres are arranged in a circle so that the points of tangency between successive smaller spheres are all positioned on the circumference of the identical pitch circles of the gears. This condition dictates the parameters of the first construction shown in FIG. 5A. In a preferred design of the invention, each gear is designed to have only six teeth so that, when the axes of the spherical gears are aligned at 180°, all twelve of the teeth are in full mesh. Therefore, for the construction of this preferred design, twelve small identical spheres 40 are arranged in a circle about center 30 of the predetermined identical theoretical pitch circles 42 of the two gears. The diameter d of the spheres is selected so that the spheres are tangent to each other along the predetermined identical theoretical pitch circles 42 of the two gears. As indicated above, the pitch circle of each gear is a great circle on the identical pitch spheres of the gears which are sized to fit within the limited physical space in which the gearing must operate. Each smaller sphere 40 represents one gear tooth, and the twelve small spheres represent all twelve of the teeth in full mesh when the gear axes are at 180°. [NOTE: Persons skilled in the gearing art may appreciate that it is possible to design a gear pair with mating teeth where the teeth of one gear have a different chordal thickness than the teeth of the other gear of the pair. Where such a design is desired, one-half of the smaller construction spheres are smaller than the other half, but the different-sized construction spheres still intersect each other in a similar fashion, with the points of tangency between successive smaller spheres all being similarly positioned on the circumference of the identical pitch circles of the gears, namely, on the great circles of the two larger theoretical and concentric spheres.]

(3) The construct includes an additional small central sphere 44 positioned at the coincident centers of pitch circles 42, small central sphere 44 being the same size as small spheres 40.

(4) A construction involving central sphere 44 and a selected one 40' of the small spheres 40 is used to determine the vertex angle for the conical surfaces of the cone-shaped tooth faces of each straight-sided tooth of the internal gear. Two crossing lines 46, 47 are constructed tangent to opposite sides of central sphere 44, each respective tangent line 46, 47 passing through a respective one of the two points of tangency that selected sphere 40' shares with its neighboring spheres. Namely, line 46 passes through tangent point 48 and line 47 passes through tangent point 49. A cone construct 50 is shown in heavy solid lines in FIG. 5A, and cone construct 50 is used to determine the vertex angle 52 of the conical surfaces of the tooth faces 56', 57' of an interior tooth 58' shown in a top view in FIG. 5B. Thus, as can be seen from FIG. 5A and FIG. 5B, each conical tooth face 56', 57' has a straight profile as measured from top to bottom and a circular lengthwise curvature as measured along its full width from side to side. The size of cone vertex angle 52 is determined by the included angle formed at the point of intersection c of crossing lines 46, 47. In the preferred embodiment of the invention shown in FIGS. 1 and 2, this construction provides a cone vertex angle of 60°.

Figure 5A:
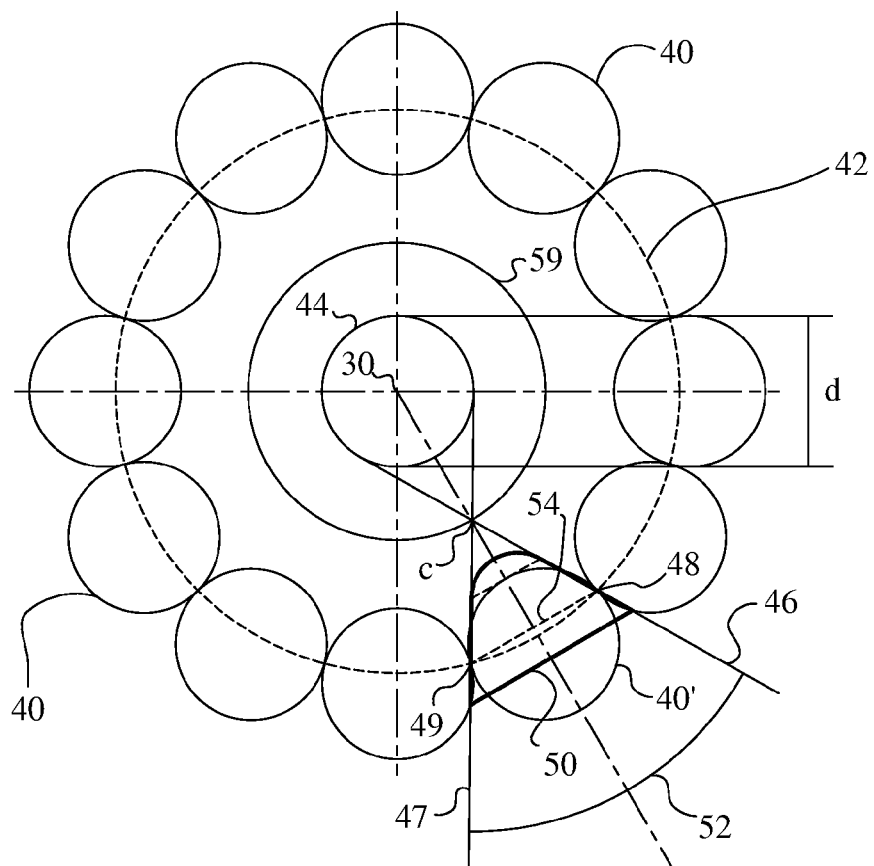
FIG. 5A shows a first step in geometric constructions for determining the tooth shapes for a pair of spherical gears in an embodiment of the present invention.
Figure 5B:
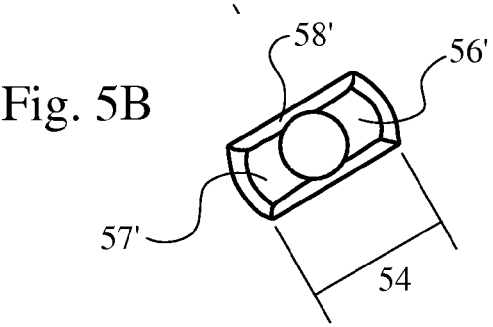
FIG. 5B shows a second step in geometric constructions for determining the tooth shapes for a pair of spherical gears.

(5) The same construction shown in FIG. 5A is used to determine the normal chordal thickness 54 of each gear tooth. In the construction, normal chordal thickness 54 is measured on each selected smaller sphere 40' at the pitch line of its respective gear, i.e., between each of the two respective points of tangency that one selected sphere 40' shares with its neighboring spheres. This normal chordal thickness 54 is also indicated on internal tooth 58' in FIG. 5B and (in larger scale) on external tooth 60 in FIG. 5C.

(6) The construction shown in FIG. 5A is also used to determine the maximum size of centering ball 26 that is the interior spherical bearing member shared by gear pair 10, 20 (see FIGS. 1 and 2). Reference is again made to the two crossing lines 46, 47 constructed tangent to opposite sides of central sphere 44 and used to determine the vertex angle of the cone-shaped faces of the interior gear teeth. Lines 46, 47 intersect at point c, and the distance between point c and center 30 determines the radius of circle 59. Circle 59 provides the maximum circumference for centering ball 26.

Figure 5C:
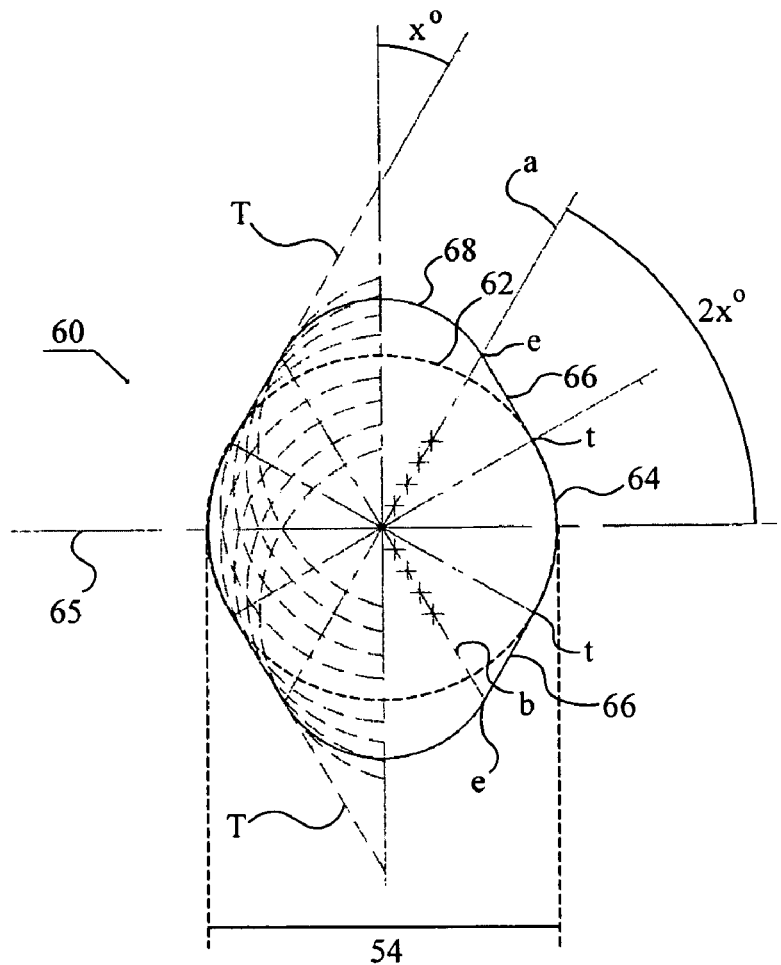
FIG. 5C shows a third step in geometric constructions for determining the tooth shapes for a pair of spherical gears, with FIG. 5C being enlarged for clarity to show a more detailed construction of one tooth face of an external gear.

(7) The construct of each tooth 60 of the internal gear of the spherical pair is shown enlarged in FIG. 5C, with the tooth 60 per se appearing in heavy solid lines:

The surface of a cylinder 62 provides the central portion 64 of each of the two faces of tooth 60. Cylinder 62 has a radius that is one-half of the normal circular thickness that forms normal chordal thickness 54 measured on smaller sphere 40. From each side of cylindrical central portion 64, each external tooth face includes a flat face extension 66 that varies in accordance with the predetermined maximum angle $x°$ (the maximum angle of intersection between the axes of the gears through which the gear pair is expected to operate), and in the construction illustrated the predetermined maximum angle is 30°. There are, of course, two flat face extensions 66, one on each side of cylindrical central portion 64.

Each flat face extension 66 begins at a respective initial tangent point t located $x°$ from the center line 65 of its respective tooth face and extends to a point e intersecting a radial line of cylindrical central portion 62 measuring $2x°$, so that the length t-e of each flat portion extends an additional $x°$ beyond the initial tangent point t. Although flat face tangent extensions 66 can be further extended (as shown in broken lines), the $x°$ length of each flat face extension 66 is sufficient to assure full line contact when the axes of the gears are intersecting at the maximum predetermined angle. Preferably, as shown in FIG. 5C, each respective outboard end of flat face extension 66 is discontinued at some predetermined short distance beyond point e that demarks the just-described $x°$ length. Each of the just-described tooth faces of external tooth 60 intersects with two respective tooth end surfaces 68 that may be flat or slightly rounded as shown.

(8) The construction for developing each tangential flat extension of one working face of an external tooth is shown in the left-hand portion of FIG. 5C:

As can be appreciated from a review of FIGS. 3A, 3B, and 3C, when the circular orbit of gear 20 is tipped at an angle in any direction away from the plane of the circular orbit of internal gear 10, the circular orbit of the external teeth appears elliptical when viewed from the plane of gear 10. Also, when viewed perpendicularly from the plane of gear 10, the outer cardinal points become misaligned (e.g., in FIG. 3A: while points A, A' and C, C' are in mesh at the poles, points B' and D' fall inside points B and D when viewed perpendicularly from points B and D). Therefore, whenever the angle of intersection between the axes of the gears deviates from 180°, the pitch circle of external gear 20 effectively becomes an "elliptic arc" relative to the circular arc of the pitch circle of internal gear 10.

As will be explained in further detail below with reference to FIGS. 8, 9A, and 9B, when the external teeth roll into mesh with the internal teeth, they approach along the elliptic arc from either above or below the plane of the internal gear, and as the external teeth roll out of mesh, they leave mesh in the opposite direction. If the external teeth roll in from below the plane, they roll out above the plane. The distance the external teeth move above and below the plane of the internal gear is a function of the size of the angle of intersection between the great circle pitch circles of the gears.

As an external tooth approaches mesh along the elliptic from below the plane of the internal gear, tooth contact occurs on one side of each tooth face at one pole, and similar tooth contact occurs on the other side of the same tooth face when the same exterior tooth approaches mesh along the elliptic from above the plane of the internal gear. For purposes of the construction of FIG. 5C, it is assumed that the elliptic arc is at the maximum preferred angle $x°$ (30°). The portion of the path of the elliptic arc approaching from below the plane of internal gear 10 is indicated by line a, while the portion of the path of the elliptic arc approaching from above the plane of internal gear 10 is indicated by line b.

In this construction, the center of cylinder 62 (that forms the central portion 64 of the tooth face) is moved along approach line a to form a plurality of additional circular arcs (only four such arcs are shown) traced above the horizontal line passing through the center of the basic cylinder 62. Similarly, another plurality of additional circular arcs are shown traced below the horizontal line passing through the center of the basic cylinder 62 (again only four such arcs are shown). Tangents T to all these additional arcs delineate the flat-face extensions 66 on each side of cylindrical central portion 64. To state this in another way, each flat face 66 begins at initial tangent point t and extends parallel to the line (a or b) of movement of the radial center of cylindrical central portion 64 as the radial center moves along the great circle pitch circle of the external gear when the axes of the gears are intersecting at the maximum angle $x°$.

To facilitate understanding of the construction shown, extensions 66 continue a small distance beyond the minimal necessary length indicated by point e demarking the $2x°$ (60°) radial line. In this construction, the flat tooth end surfaces 68 have been rounded slightly, showing a design more amenable to the net forming manufacturing process.

Figure 5D:
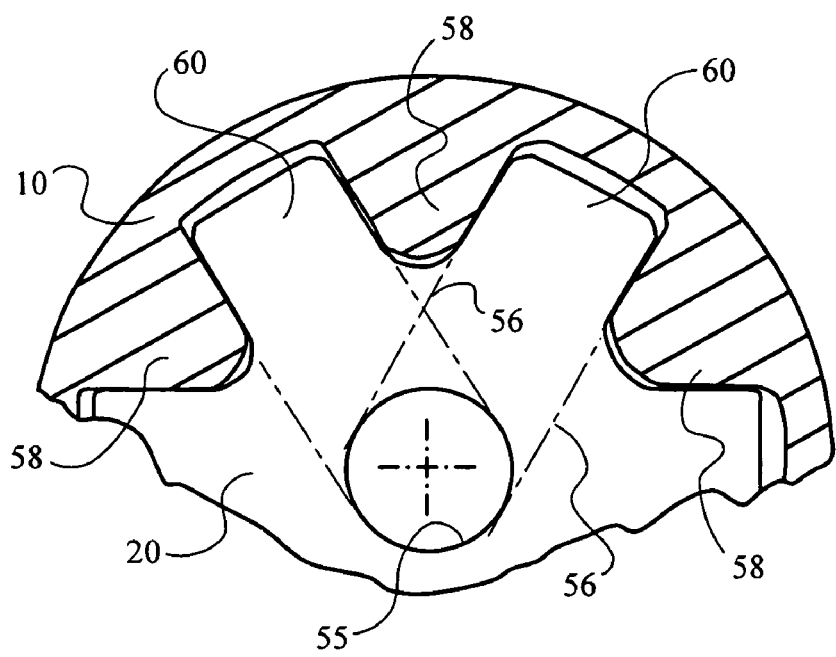
FIG. 5D shows a fourth step in geometric constructions for determining the tooth shapes for a pair of spherical gears, with FIG. 5D being a combination of a geometric construction with a schematic partial cross sectional view of a portion of a pair of gears using such tooth designs.

(9) For the final construction, reference is made to FIG. 5D which is a partial and schematic view of internal gear 10 and external gear 20 taken in the radial center plane of the gears. The respective gear teeth, constructed in the manner just described above, are shown with the gears in full mesh when their respective axes are aligned at 180°. Three internal teeth 58 are shown in mesh with two external teeth 60. As indicated earlier, it can be seen that the working surfaces of all the teeth are straight-sided. External teeth 60 have a spline shape with a dimension determined by extension lines 56 from circle 55 that has a diameter equal in length to normal chordal thickness 54.

When the axes of the spherical gears of the invention are in 180° alignment, all of the teeth of gears 10 and 20 mesh together in the same manner as the teeth of a geared coupling. However, as indicated above, whenever the axes of spherical gears are positioned out of the 180° alignment, the gears are constantly moving into and out of mesh at each pole, i.e., their two shared meshing centers. In this regard, it should be understood that in preferred embodiments of spherical gears no substantial backlash is required; although, of course, a tolerance is left between the teeth of the respective gears (e.g., 0.002"/0.05 mm) for manufacturing assembly and lubrication. Also, the top lands of the teeth are provided with spherical relief.

Figure 6A:
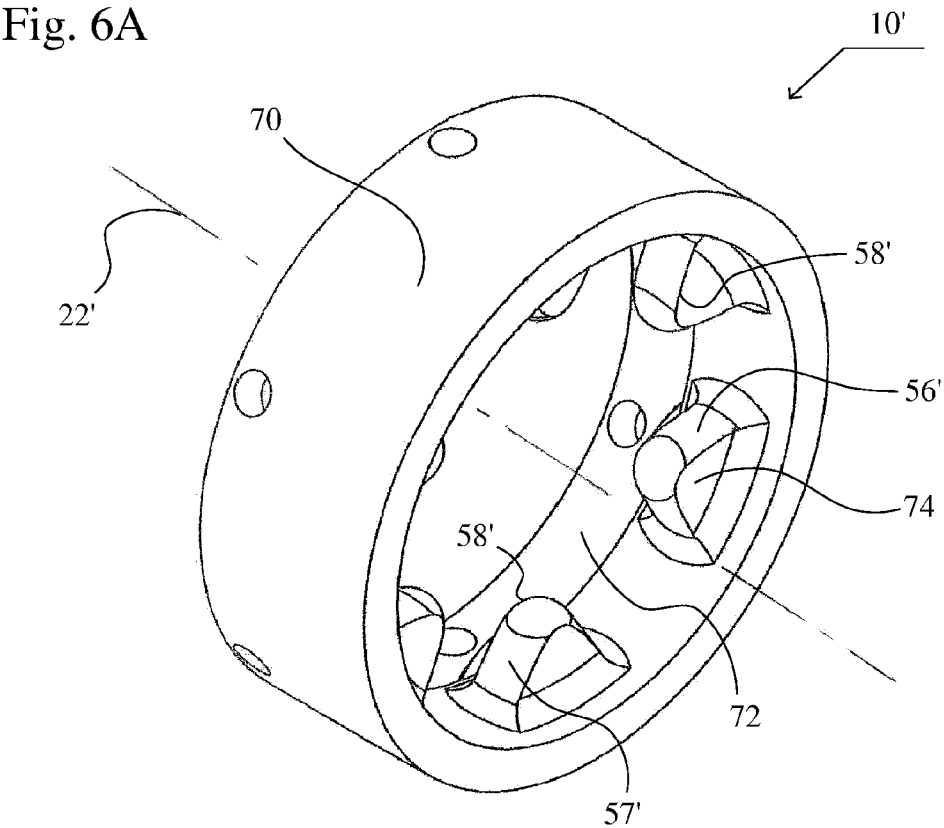
FIG. 6A is a perspective view of the design of the first gear of a spherical pair according to a variation of the embodiment of FIGS. 1 and 2.
Figure 6B:
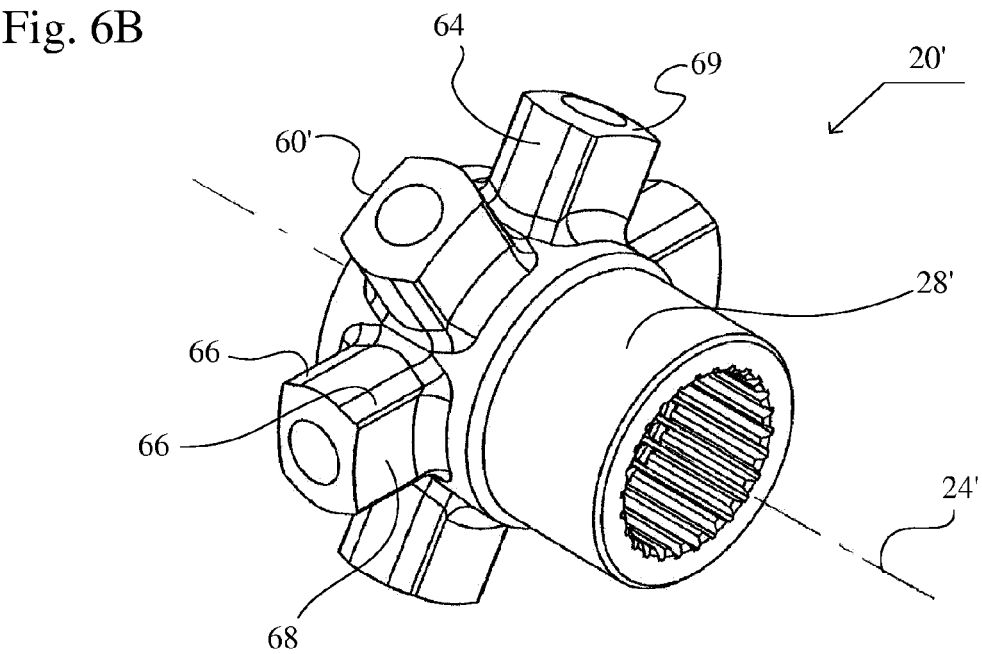
FIG. 6B is a perspective view of the design of the second gear of a spherical pair according to a variation of the embodiment of FIGS. 1 and 2.

Perspective views of a pair of spherical gears are shown, respectively and separately, in FIGS. 6A and 6B. In this embodiment, first (exterior) gear 10', in FIG. 6A, includes a basic support ring 70 having an internal surface from which each internal tooth 58' extends perpendicularly to axis 22' of gear 10'. Ring 70 includes an indented rim 72 that is formed to matingly engage the outside of the cup support for the first gear 10' (e.g., see cup 112' in FIG. 11B) so that gear 10' is fixed for rotation with the cup support. This view makes it easier to see the flat tooth end surfaces 74 that border the working surfaces of each cone-shaped tooth face 56', 57' of each internal tooth 58' of this embodiment. While such flat end surfaces reduce weight, net forming manufacture may be facilitated, and additional strength may be achieved, by filling in the non-tooth face portions of each tooth to form a full, but partially hollowed-out, cone (see the preferred embodiment disclosed in FIGS. 1, 2, and 7).

In FIG. 6B, external teeth 60' extend perpendicularly to axis 24' of second (interior) gear 20' that is mounted, in this embodiment, in a ring about hub 28' that includes a splined opening at one end for receiving a respective shaft (e.g., shaft 16 in FIG. 1). The other end of hub 28' (not shown) is matingly fitted over the joint's centering ball (e.g., centering ball 26 in FIGS. 1 and 2). This perspective view makes it easier to see the cylindrical central portion 64 and the flat face extensions 66 that form the working tooth faces of each external tooth 60'. Again, as just mentioned above, flat end surfaces 68 can be rounded to facilitate manufacture. Also to be noted is the spherical relief of each top land 69 of the exterior gear.

Figure 7:
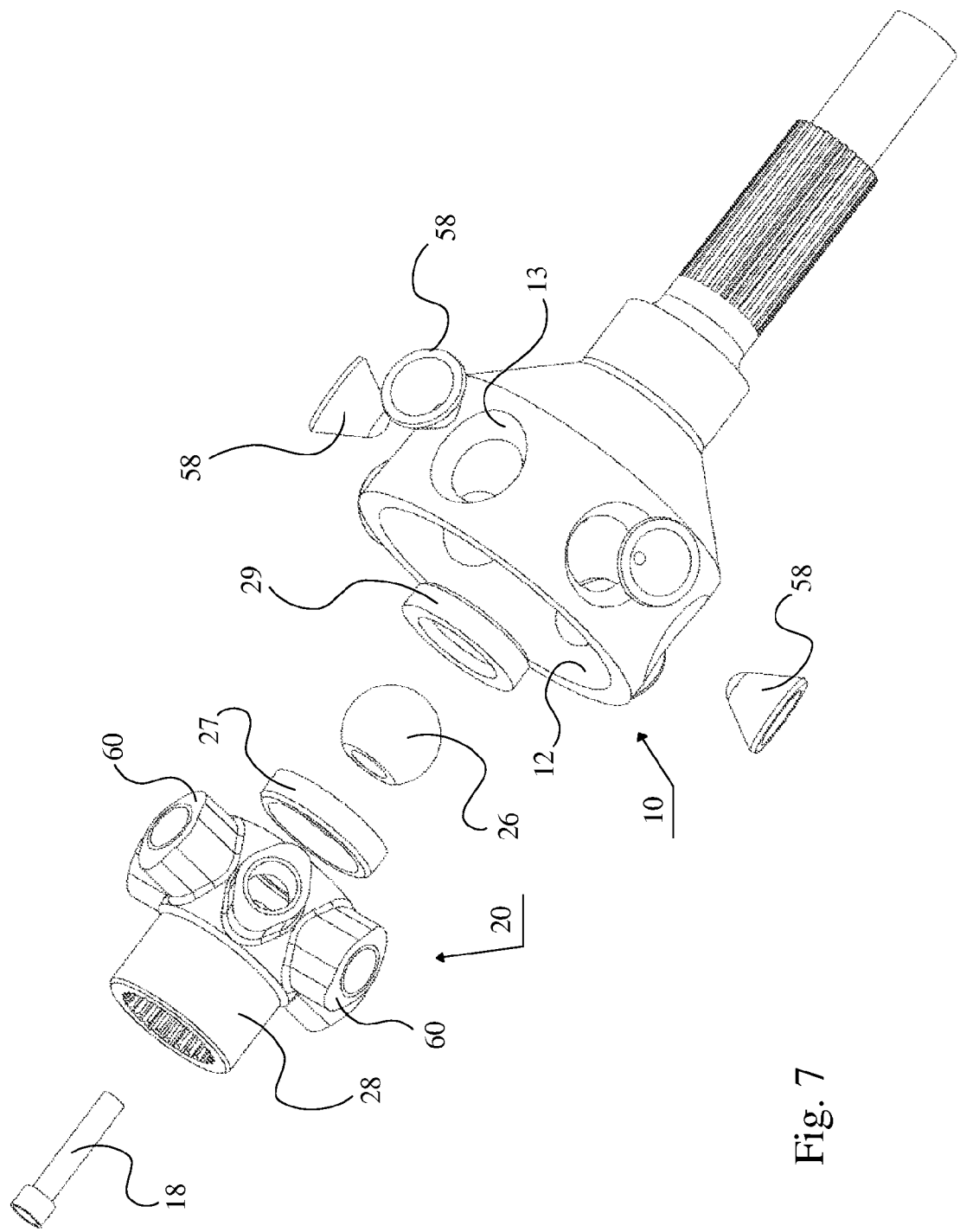
FIG. 7 is an exploded view of the variation of the invention's CV-joint shown in FIGS. 6A and 6B.

FIG. 7 shows an exploded view of the design of the invention's CV-joint illustrated in FIGS. 1 and 2. In this preferred embodiment, the teeth 58 of interior gear 10 are separately formed and press-fitted into pre-formed apertures 13 in the walls of support cup 12, while the hollow teeth 60 of exterior gear 20 are formed about the exterior of a hub 28. As indicated above, centering ball 26 is captured between spherical rings 27 and 29 that are held by a C-clip (not shown in this view) within hub 28. The CV-joint is held together by bolt 18 that tightens into the base of cup 12. Both internal teeth 58 and external teeth 60 are hollowed out to save metal and weight. Exterior teeth 60 may be formed integrally with the hub or in a separate ring that is press-fitted over the hub.

Tooth Contact Pattern

The straight-sided tooth surfaces just described above create a relatively long line of contact throughout mesh during the entire continuum of angles of intersection. The length of this line contact is most easily seen in FIG. 5D which shows the contact at full mesh when the axes of the gears are in straight alignment. Persons skilled in the art will appreciate that this line contact is quite long. For instance, in an actual joint designed according to the invention as disclosed, each smaller sphere 40 had a diameter of 0.75" (19 mm), the pitch circles 42 of the gears were 2.625" (67 mm), the centering ball 26 had a diameter of 0.9375" (24 mm), and the length of the line contact was 0.4375" (11 mm).

As the axes of the gears move out of alignment, the mesh quickly moves from all twelve teeth, and most of the load is carried primarily by four teeth. Namely, as explained above, as the axes of the spherical gears move out of alignment, the great-circle pitch circles of the gears intersect at two "poles" 180° apart (e.g., like circles of longitude on a globe of the earth intersecting at the north pole and south pole). Except for very small angles of intersection, most of the load is shared by the two teeth on each gear that mesh at each pole position. However, there is sufficient overlap so that a smooth transition exists between successive sets of meshing internal and external teeth at each pole. That is, the tooth contact is rolling off the preceding pair of teeth as it rolls onto the succeeding pair.

As the angle of intersection increases, the length of line contact remains the same. The line contact patterns are illustrated in dark, heavy lines in the chart shown in FIG. 8 which shows the position of the lines of contact on the respective tooth faces of both the internal teeth (I) and the external teeth (E) at −30°, −18°, −12°, −6°, 0°, +6°, +12°, +18°, and +30° at the moment the teeth move through the pole position. As can be seen, the line contact remains vertical to the tooth face of the external teeth of the interior gear at all times, but it tips away from the vertical on each internal cone-shaped tooth face of the exterior gear. As the angle between the gears increases, the lines of contact roll through increasingly larger contact areas extending away from the respective centers of the gear faces. While the lines on each external gear face remain vertical to the gear face, the lines on the respective internal cone-shaped tooth face become more and more tipped to the vertical as they move away from the center of the cone-shaped tooth face. The lines shown in FIG. 8 indicate the outer extremity of the contact pattern at each angle of axial intersection, the gears rolling through contact from the center of the tooth faces to the positions shown.

When the line contacts are moving and tipping to the left on the respective tooth faces at one pole, they are moving and tipping to the right in exactly the same manner at the opposite pole. Since this last-mentioned fact may be difficult to understand, it is suggested that reference again be made to (a) FIGS. 3A, 3B, and 3C illustrating the relative motion between sets of tooth contact points on the theoretical spherical pitch surfaces of a pair of spherical gears rotating together in a clockwise direction, and to (b) FIGS. 9A and 9B showing the gears in contact near the respective poles when the axes of the gears intersect at the maximum angle x° from the horizontal (30° in the illustrated preferred embodiments), providing the full angular displacement of 2x° (60° shown). In FIGS. 9A and 9B it is assumed that the gears are rotating about their respective axes in the clockwise directions indicated and that external teeth 60 are driving internal teeth 58, the latter being viewed from the root circle of the exterior gear. [NOTE: in FIGS. 9A and 9B, the cup-like support 12 for the teeth of exterior gear 10 (FIGS. 1 and 2) is omitted for clarity.]

Figure 9A:
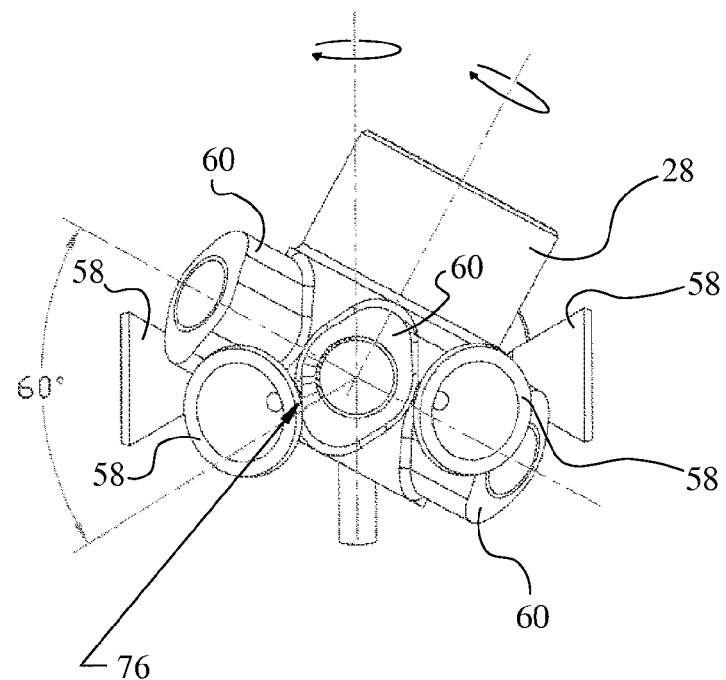
FIG. 9A is a first view of the CV-joint of FIG. 7, the cup support for the internal teeth of the first gear being omitted for clarity.

In FIG. 9A, a central external tooth 60 of interior gear 20 is exactly aligned with one pole as tooth 60 rises from below the plane of exterior gear 10, being shown just before the moment it moves out of contact with internal tooth 58. The position of this line of contact is indicated by arrow 76. FIG. 9B shows the same gear pair of FIG. 9A at the same instant in time, but viewed from the opposite pole. In FIG. 9B, a central external tooth 60 of external gear 20 is again exactly aligned with the opposite pole but, of course, is shown moving down from above the plane of exterior gear 10, again being shown just before the moment it moves out of contact with internal tooth 58. The position of this latter line of contact is indicated by arrow 77.

Figures 8, 15:
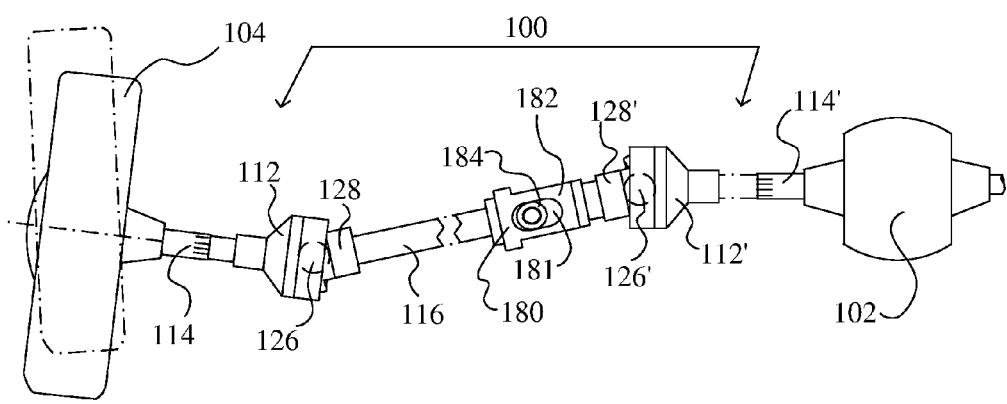
FIG. 8 is a chart representing the positions of the line contact shared by the meshing teeth of the spherical gears in the CV-joint of FIG. 7, showing the relative positions of the line of contact on each of two meshing tooth faces at various angles of intersection between the axes of the axles, the shape of the tooth faces being flattened onto the surface of the drawing and slightly exaggerated to facilitate perception.
FIG. 15 is a schematic representation of a half-shaft with CV-joints of the present invention at each end in combination with a plunge-unit slider.
Figure 9B:
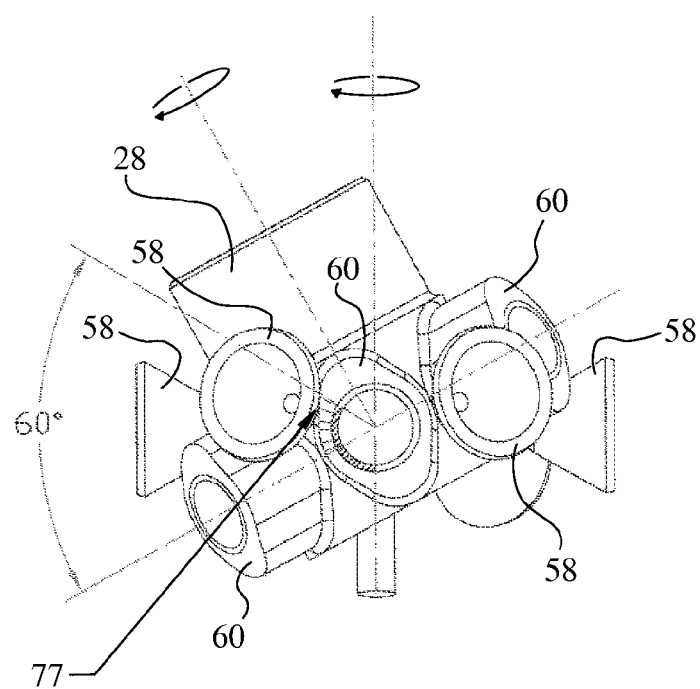
FIG. 9B is a second view of the CV-joint of FIG. 7, taken from the opposite pole of the spherical gears and at the same moment in time during meshing engagement as FIG. 9A.

In FIGS. 9A and 9B, a portion of the top land of each centrally positioned external tooth 60 is marked with thin cross hatching indicating alignment with the entire working face of the tooth. A series of dark straight lines appear on the lower half of the working face of external tooth 60 in FIG. 9A, and a similar series of straight lines appear on the upper half of the working face of external tooth 60 in FIG. 9B. These lines represent the series of line contacts shown earlier in FIG. 8, showing the contact pattern shared by the teeth as they roll through their respective meshing engagements at each pole. These respective contacts occur simultaneously on opposite halves of each tooth face, providing a balance of both load and wear.

Although most of the load is shared by only two teeth in mesh at each pole, at least four teeth are in full mesh at all times, and the total load is always divided between at least two points separated by 180°. For instance, returning to an actual joint designed according to the embodiment discussed above, the length of the line contact was 0.4375" (11 mm). Therefore, it is important to remember that the total load is distributed over two lines totaling 0.875" (22 mm). Also, the loads are balanced at all times on the gears as the teeth are meshing simultaneously at the two poles on opposite sides of both gears.

In another very important difference from the prior art spherical gearing discussed in the Background above, the teeth disclosed herein do not have theoretical sliding contact similar to hypoid gearing. Contrarily, the line contact just described above rolls through mesh at both poles. This very important feature facilitates lubrication and reduces wear.

Ball-Tooth Embodiment

Figure 10A:
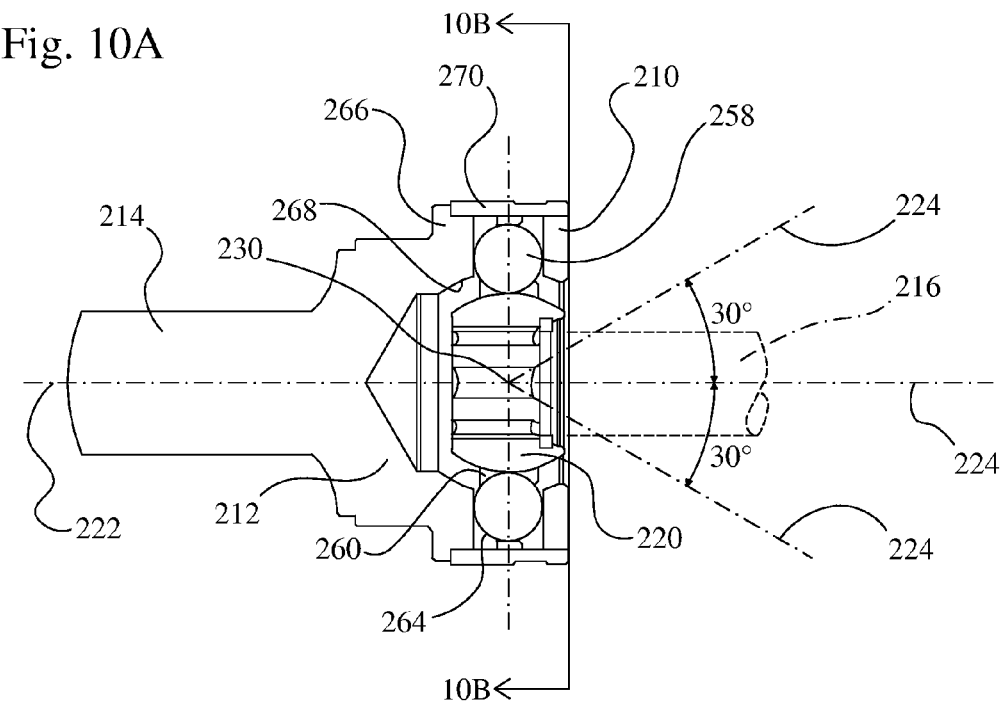
FIG. 10A is a schematic and partially cross sectional side view of an embodiment of a spherical-gear CV-joint according to the invention, using balls for the internal teeth of the first gear, the respective axle shafts being shown with their axes in 180° alignment.
Figure 10B:
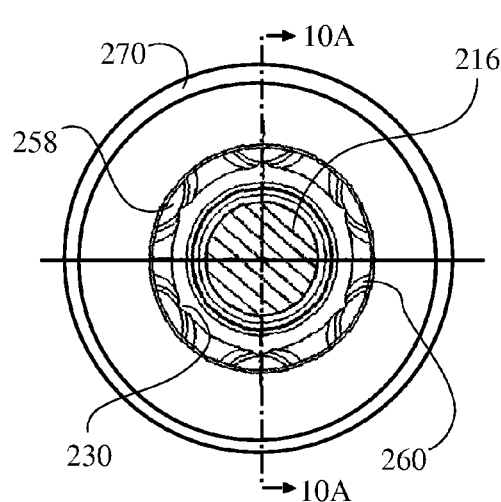
FIG. 10B is a schematic and partially cross sectional end view of the embodiment of FIG. 10A as viewed along the plane 10B-10B.
Figure 10C:
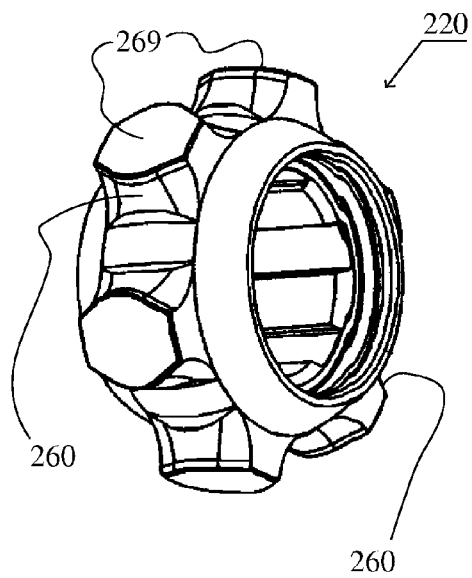
FIG. 10C is a perspective view of the second gear of the spherical pair illustrated in FIGS. 10A and 10B with other parts removed to improve clarity.
Figure 11:
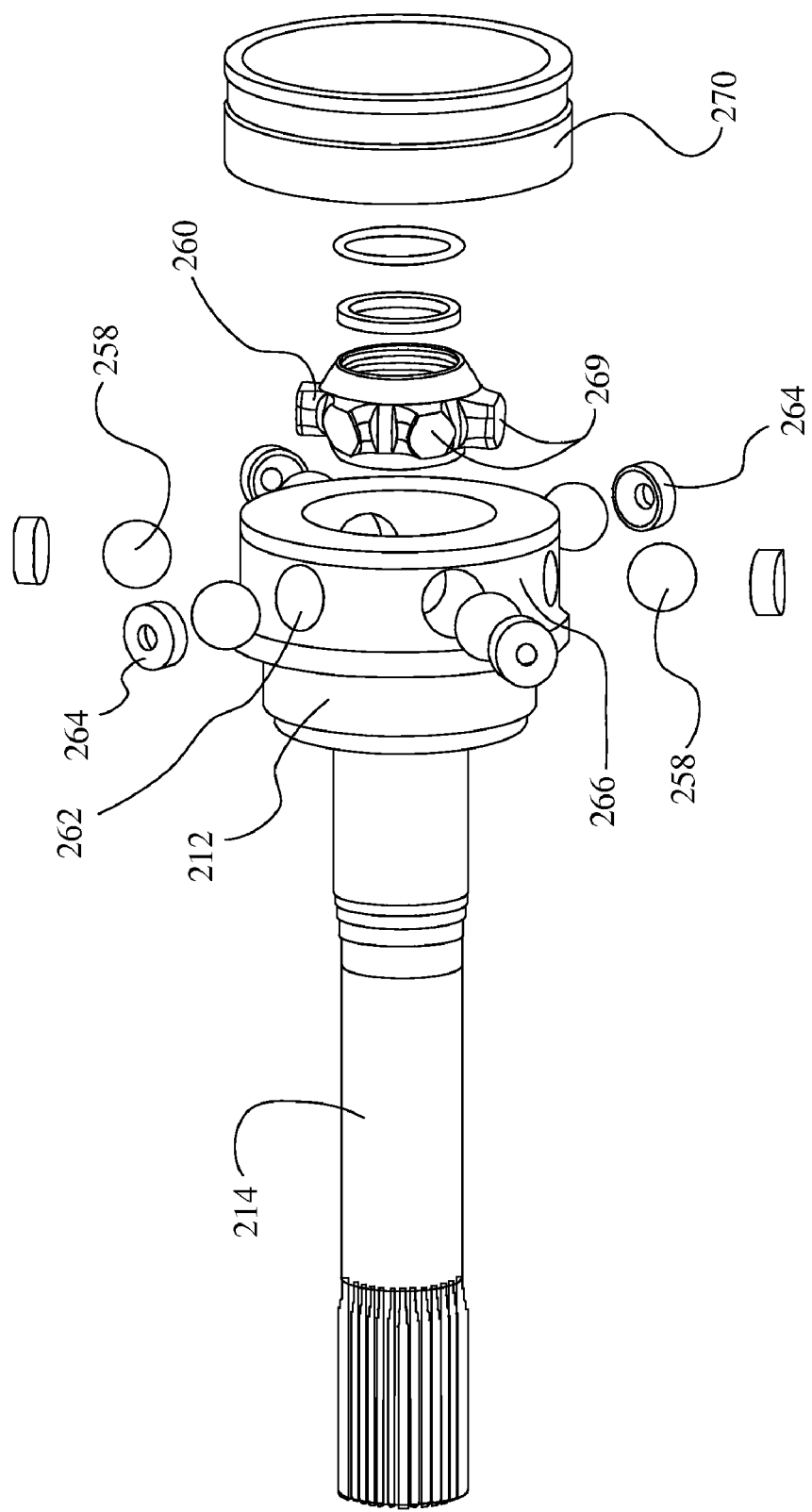
FIG. 11 is an exploded view of the embodiment of the invention's CV-joint shown in FIGS. 10A, 10B, and 10C.

Another preferred embodiment of the invention is shown in FIGS. 10A, 10B, 10C, and, in an exploded view, in FIG. 11. In this further embodiment, the internal teeth of the exterior gear 210 are replaced by balls 258 having the same diameters as the smaller spheres 40 (in construction FIG. 5A) that represent each respective internal tooth of the spherical gear pair. Therefore, each internal gear tooth 258 has an effective "spherical" tooth face. For this preferred embodiment, the above-described construction steps relating to the formation of "cone"-faced internal teeth 58 are not relevant. However, external teeth 260 of interior gear 220 of this further embodiment are still constructed as indicated in FIG. 5C and can best be seen in FIG. 10C.

As with each of the earlier embodiments discussed above, the spherical gear pair of this embodiment is designed to connect the rotation of respective first and second shafts 214 and 216 as the respective axes of the shafts 222, 224 intersect at point 230 (the concentric center of the spherical gear pair) throughout a range of angles indicated by phantom lines 224 in FIG. 10A. The second shaft 216 is omitted from FIG. 11 for clarity. Similar to the earlier embodiments (e.g., see FIG. 7), internal ball teeth 258 are positioned in a cup-like support 212 that is fixed to the end of first shaft 214 that is aligned with axis 222, each ball tooth 258 being received in a respective aperture 262 of a core housing 266 associated with cup-like support 212 (best seen in FIG. 11). Also, the external teeth 260 are similarly mounted to the end of second shaft 216. Again, at all times and at all angles of intersection between shafts 214 and 216, internal ball teeth 258 and external teeth 260 remain, respectively, in the plane of the pitch circle of each respective gear. As indicated above, each respective pitch circle is a great circle of the gear's theoretical large pitch sphere, and the axis of each pitch circle remains aligned at all times with the axis of the respective rotatable element to which each spherical gear of the pair is affixed.

The gear pair is initially mounted together with the respective axes 222, 224 aligned as indicated in FIG. 10A. After each ball tooth 258 is inserted in a respective aperture 262, the inner portion of the ball tooth nestles between the tooth faces of two consecutive exterior teeth 260, and aperture 262 is thereafter closed with a ball retainer 264 that may be close-fitted, press fit, or screwed in place to maintain the tooth face of each ball so that it is centered on the pitch circle of the gear. A shrink-fitted or bolted outer ring 270 surrounds the open end of cup-like support 212 for further strength and security.

Core housing 266 of cup-like support 212 includes a spherical surface 268 that mates with the spherical surfaces 269 formed on the top lands of external teeth 260 to maintain the concentricity of the centers of the pitch spheres of external spherical gear 210 and internal spherical gear 220 to assure constant velocity rotation at all relative angular intersection of shafts 214 and 216 in any direction from axis 222 up to the predetermined maximum angle x° that, for the embodiments shown in FIGS. 10A, 10B, 10C, and 11, is 30°, providing a total range of 60° in any direction. It will be appreciated that mating spherical surfaces 268, 269 serve the same function as centering ball 26 of the embodiment of the invention described above (e.g., see FIG. 7).

As different from the tooth contact patterns described above for the tooth-tooth embodiments, internal ball teeth 258 do not mesh with the external teeth 260 with line contact. Instead, the spherical tooth surfaces of the ball teeth create an extended circular area of contact similar to the relatively broad contact area that is the acceptable result usually produced from the theoretical point contact of traditional gearing.

Figure 12:
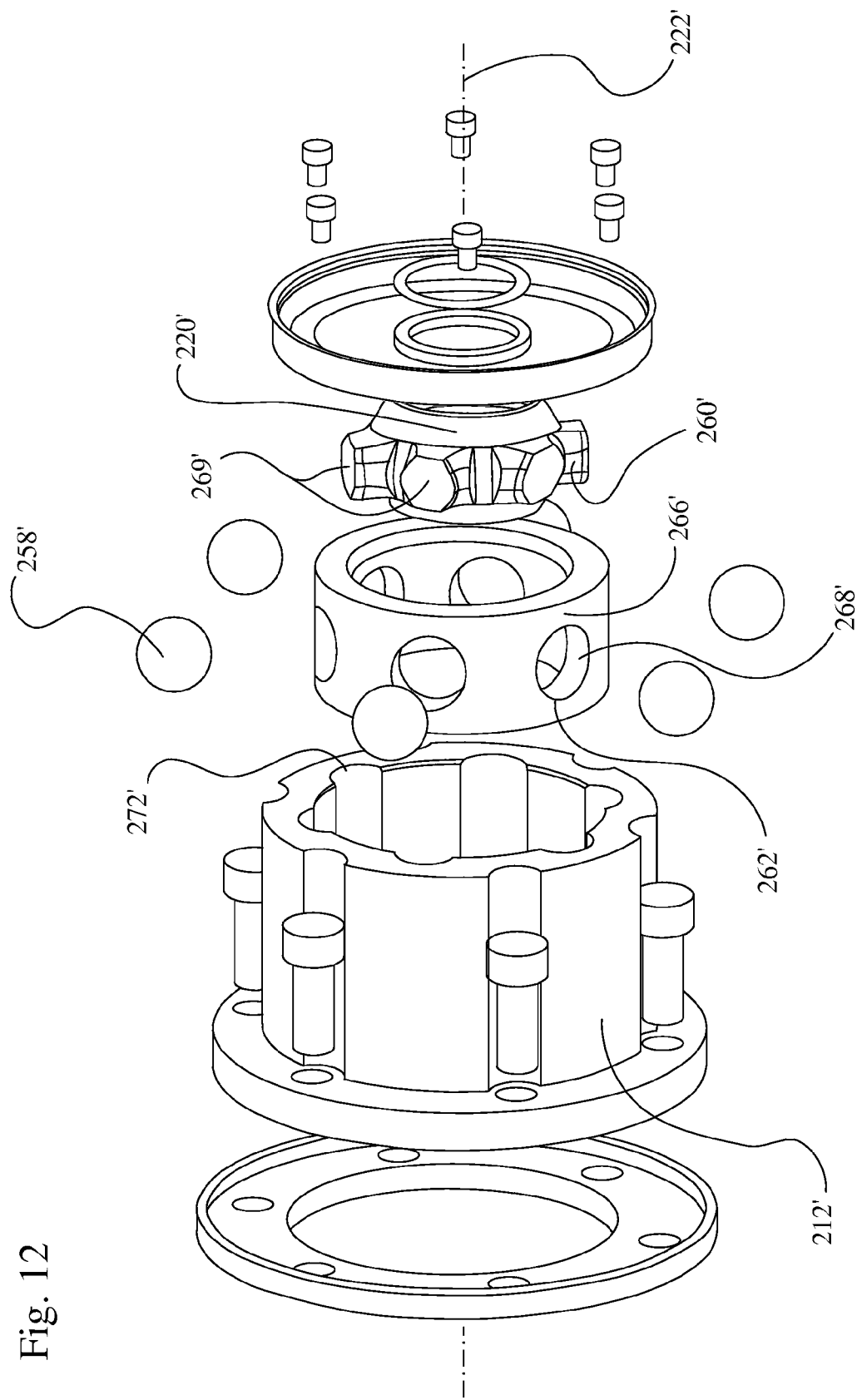
FIG. 12 is an exploded view of a variation of the mounting of the first gear of the ball-tooth embodiment shown in FIG. 11 that permits the CV-joint of the invention to function as both a CV-joint and a slider for half-shaft operation.
Figure 13A:
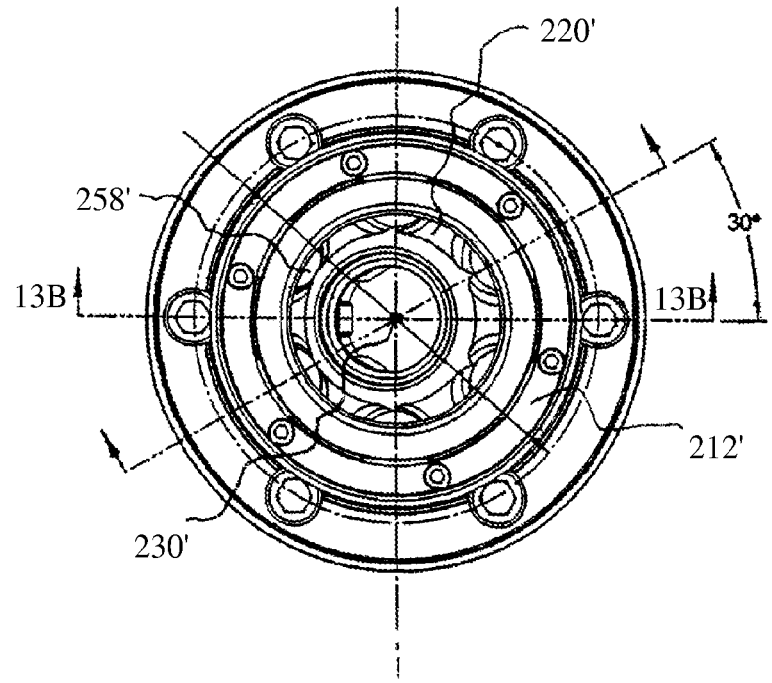
FIG. 13A is a schematic and partially cross sectional end view of the ball-tooth embodiment shown in FIG. 12.
Figure 13B:
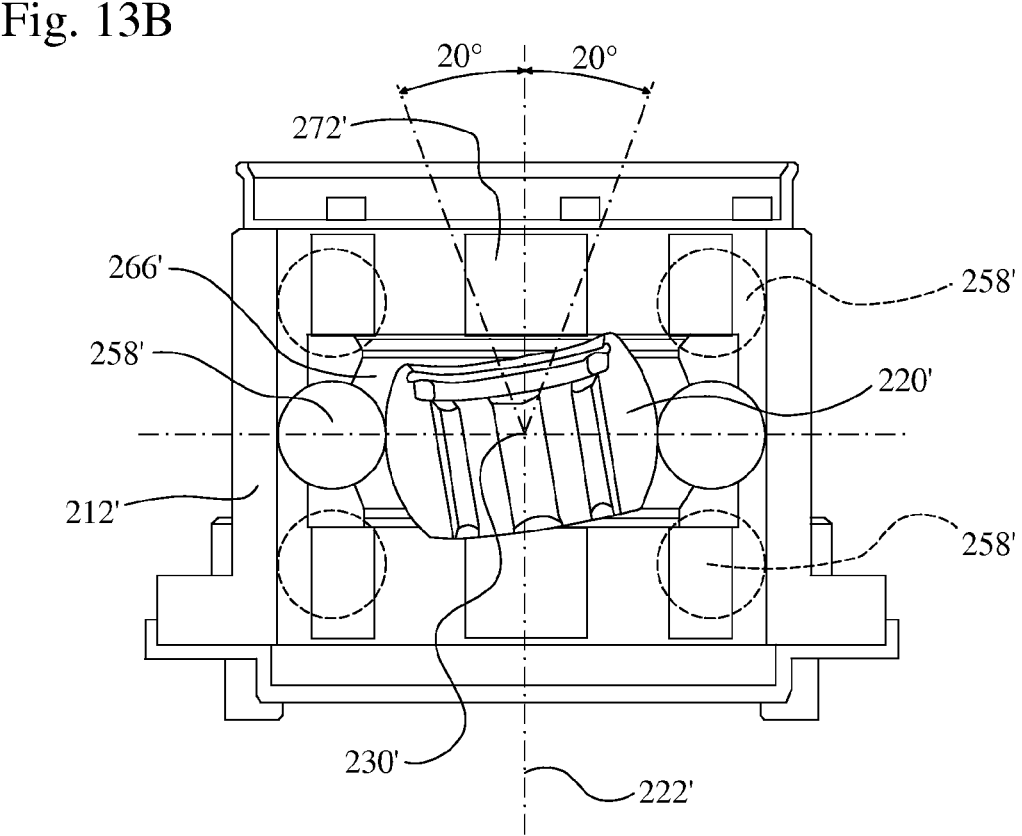
FIG. 13B is a schematic and partially cross sectional side view of the ball-tooth embodiment shown along the plane 13B-13B of FIG. 13A, showing phantom balls to indicate the range of sliding movement of the movement of the core housing within the cup-shaped support.

FIGS. 12, 13A, and 13B illustrate a variation of the just-described ball-tooth spherical joint in which the cup-like support 212' for the first gear of the pair is aligned with axis 222' and modified to act as a combination slider-joint for one end of a half-shaft. As in the previous embodiment, the core housing 266' of the cup-like support 212' includes apertures 262' with a spherical surface 268' that mates with the spherical surfaces 269' formed on the top lands of the external teeth 260' of the internal gear 220'. For clarity, the shafts of each spherical-gear pair have been omitted from these three drawings.

The most significant modifications provided in this embodiment are a) the extension of cup-like support 212' parallel to axis 222' and b) the slidable mounting of spherical core housing 266' for axial movement of the concentric centers 230' of the spherical gear pair within support 212' to accommodate different distances between the operating ends of a half-shaft. Each ball tooth 258' serves a dual function: in addition to acting as a meshing tooth of the spherical gear pair, each ball tooth 258' also has the freedom to roll up and down a respective axial ball track 272' formed in the interior wall of cup-like support 212'. In an actual joint designed according to the invention, the length of the ball tracks 272' is 2" (5 cm). FIG. 13B indicates a design variation that can accommodate conditions requiring an unusually large amount of plunging motion. Under these unusual conditions, the possible restriction created by the side-walls at the open end of the cup, i.e., when core housing 266' is positioned at the bottom of cup-like support 212', the relative angular adjustment of the inner CV-joint gear pair is limited to +/−20°. However, with progressively smaller, i.e., more standard, plunge-motion requirements, the relative angular capacity of the inner CV-joint gear pair of the invention's half-shaft progressively increases to well above the +/−20° limitation illustrated.

However, it must be noted that the axial movement of the ball teeth 258' in ball tracks 272' has only one function, namely, to change the effective position of the concentric centers of the spherical gear pair along axis 222'. This axial movement of ball teeth 258' in ball tracks 272' does not alter whatsoever the constant velocity operation of the ball teeth of the spherical gearing since the pitch circles of the two spherical gears continue at all times to share the same concentric center.

Double CV-joint

Figure 14:
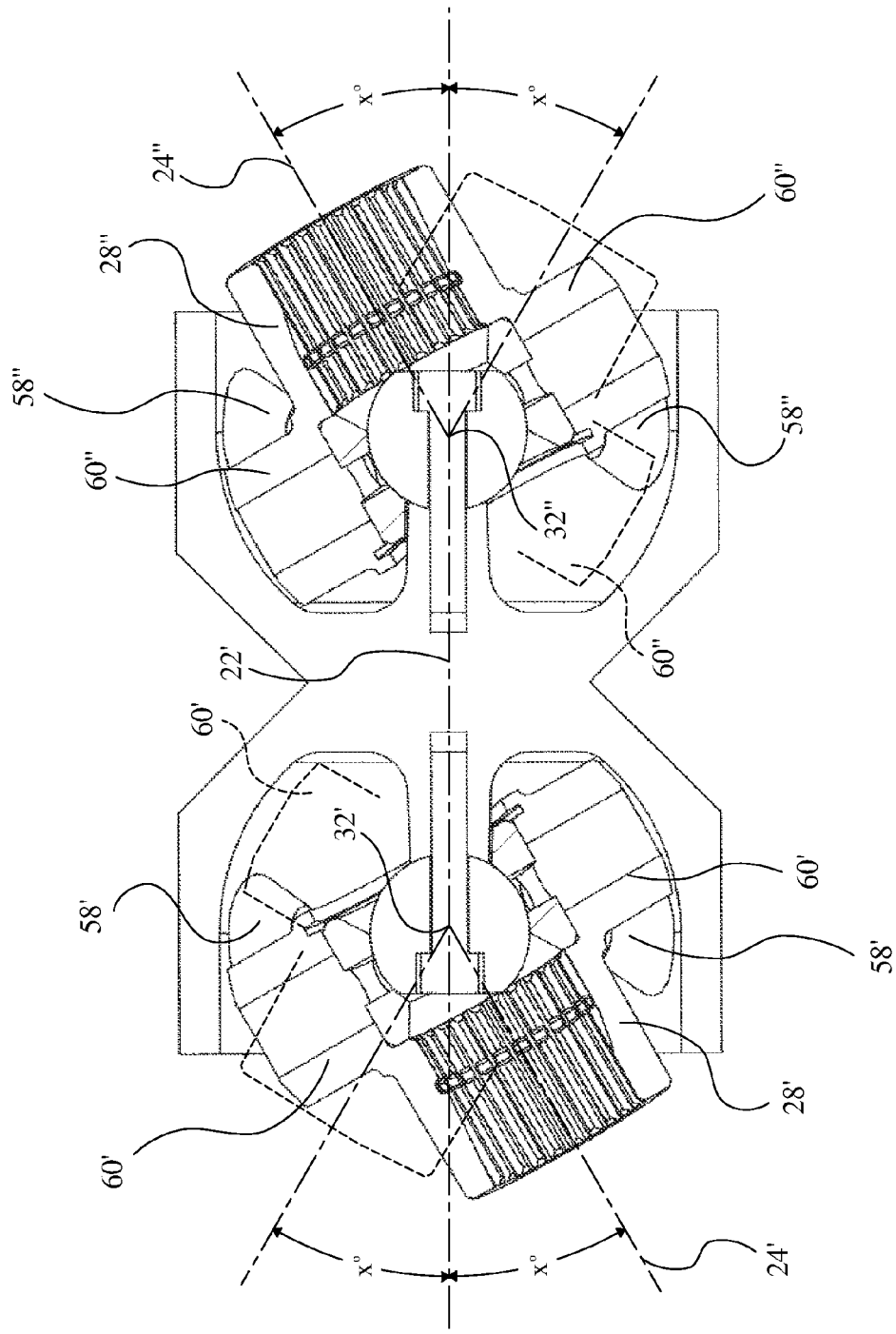
FIG. 14 is a schematic representation of a double universal joint using only CV-joints of the present invention.

Segmental drive shafts, such as those common on large trucks, are generally connected with combinations of Cardan or Hooke universal joints. These prior art couplings are hard to maintain and are relatively short-lived. As indicated above, persons skilled in this art will immediately appreciate that by placing two of the invention's spherical-gear joints back-toback, like a double Cardan universal joint, constant velocity rotational motion can be transmitted by shafts intersecting throughout a continuous maximum range of 120° or more. Such an arrangement is shown in FIG. 14 using a variation of the embodiment of the invention shown in FIG. 7 to connect the ends of the first and second shafts positioned along the axes 24' and 24". In FIG. 14, the relative positions of the internal cone teeth 58', 58" of the back-to-back exterior gears have been modified slightly for clarity. Namely, in the preferred design, teeth 58' are relatively offset from teeth 58" by 30° to cancel sinusoidal effects.

The external teeth 60', 60" are shown in solid lines pivoted about a pivot axis 32', 32". An external tooth 60', 60" is also shown in phantom lines pivoted about axes 32', 32" at an angle x° in the opposite direction, providing a full range of motion of 4x° (120° when x is 30) in all directions. Hubs 28', 28" and internal teeth 58', 58" are also shown in FIG. 14. In this embodiment, the first universal coupling is fixedly mounted to the second universal coupling through a first element. This provides a continuous range of motion of 4x° between a second element extending from the first universal coupling and a third element extending from the second universal coupling.

Use in Automotive Half-Shaft

Figure 16A:
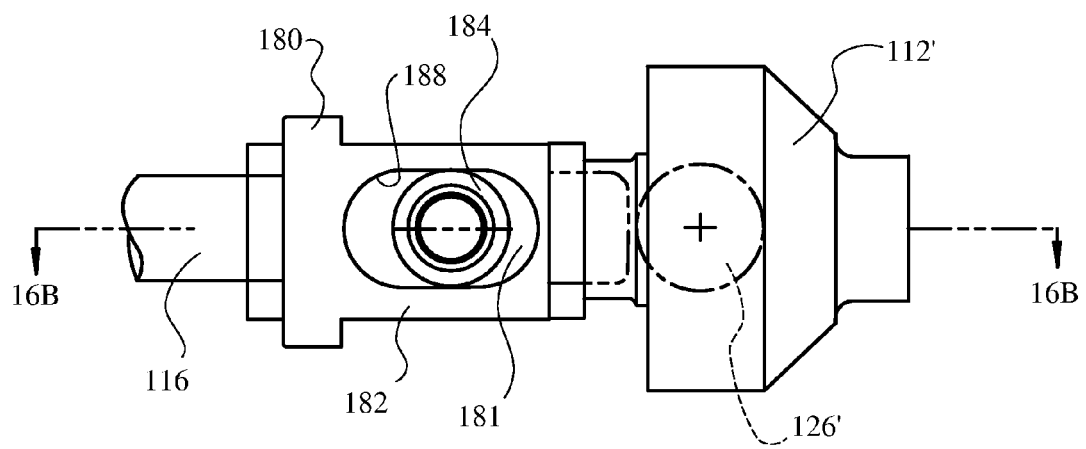
FIG. 16A is a side view of the plunge-unit slider shown positioned between the inventive CV-joints on the half-shaft of FIG. 15.
Figure 16B:
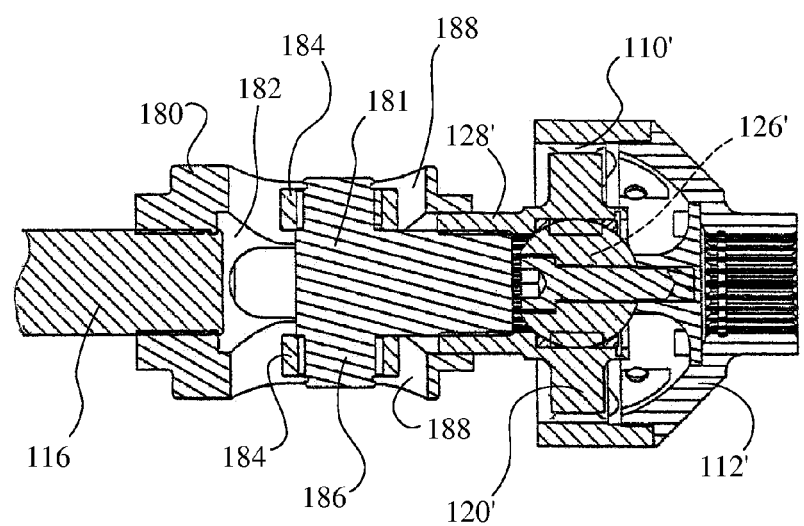
FIG. 16B is a cross sectional view taken along the plane 16B-16B of FIG. 16A.

Reference is now made to FIGS. 15, 16A, and 16B. Two identical spherical-gear CV-joints according to the invention are positioned at the opposite ends of a half-shaft 100, schematically represented in FIG. 15 with the "boots" removed (i.e., without the well-known supple coverings used to protect the joints from road debris and dirt). In the manner explained in greater detail above, the respective cup-like supports 112, 112' of each CV-joint have a respective centering ball 126, 126' fixed to the base of the cup, and each CV-joint has a hub 128, 128' that fits about each respective centering ball 126, 126' for movement throughout a continuum of angular orientations from 0° to a predetermined maximum angle of x° in all directions. Each CV-joint also has a first spherical gear with internal teeth (110' in FIG. 16B) fixed within each cup-shaped support, and a second spherical gear with external teeth (120' in FIG. 16B) fixed to each hub (128' in FIG. 16B). In the preferred embodiment shown, the hubs 128, 128' of each CV-joint are, respectively, connected for rotation at each end of a shaft 116. The base of each cup-like support 112, 112' has a splined opening for receiving the ends of respective connecting shafts 114, 114'.

The schematic illustration of FIG. 15 shows automotive half-shaft 100 at the end of a vehicular drive train that includes a differential 102 and a drive wheel 104. While not shown in this schematic illustration, it is assumed that drive wheel 104 is mounted on the front of a vehicle in a manner well known in the art so that drive wheel 104 has freedom of movement throughout a continuum of angular orientations relative to differential 102 that permit the drive wheel to turn for steering and to move up and down in response to terrain changes. Half-shaft 100 transfers constant velocity rotational forces from the vehicle engine through differential 102 to drive wheel 104 during all relative instantaneous angular movements occurring between these two portions of the vehicular drive train.

Those skilled in the art appreciate that as movably-mounted drive wheel 104 changes angular position relative to the fixed position of differential 102, the distance between them changes. While this change is not great (e.g., ≦1.0"/25 mm), it must be compensated, and this is accomplished by a slider 180 shown in larger scale in FIGS. 16A and 16B. Slider 180 includes two relatively movable members 181, 182, the first member 181 being mounted for reciprocation within the second member 182. Member 181 is fixed to hub 128' and preferably has a pair of rollers 184 suspended from a cross arm 186. Rollers 184 ride in a pair of respective tracks 188 formed in exterior member 182 that is fixed, respectively, to shaft 116. In response to slight distance changes between drive wheel 104 and differential 102, slider 180 moves back and forth over rollers 184. Half-shaft 100 has many significant advantages over presently-available half-shafts, as detailed below.

Figure 17:
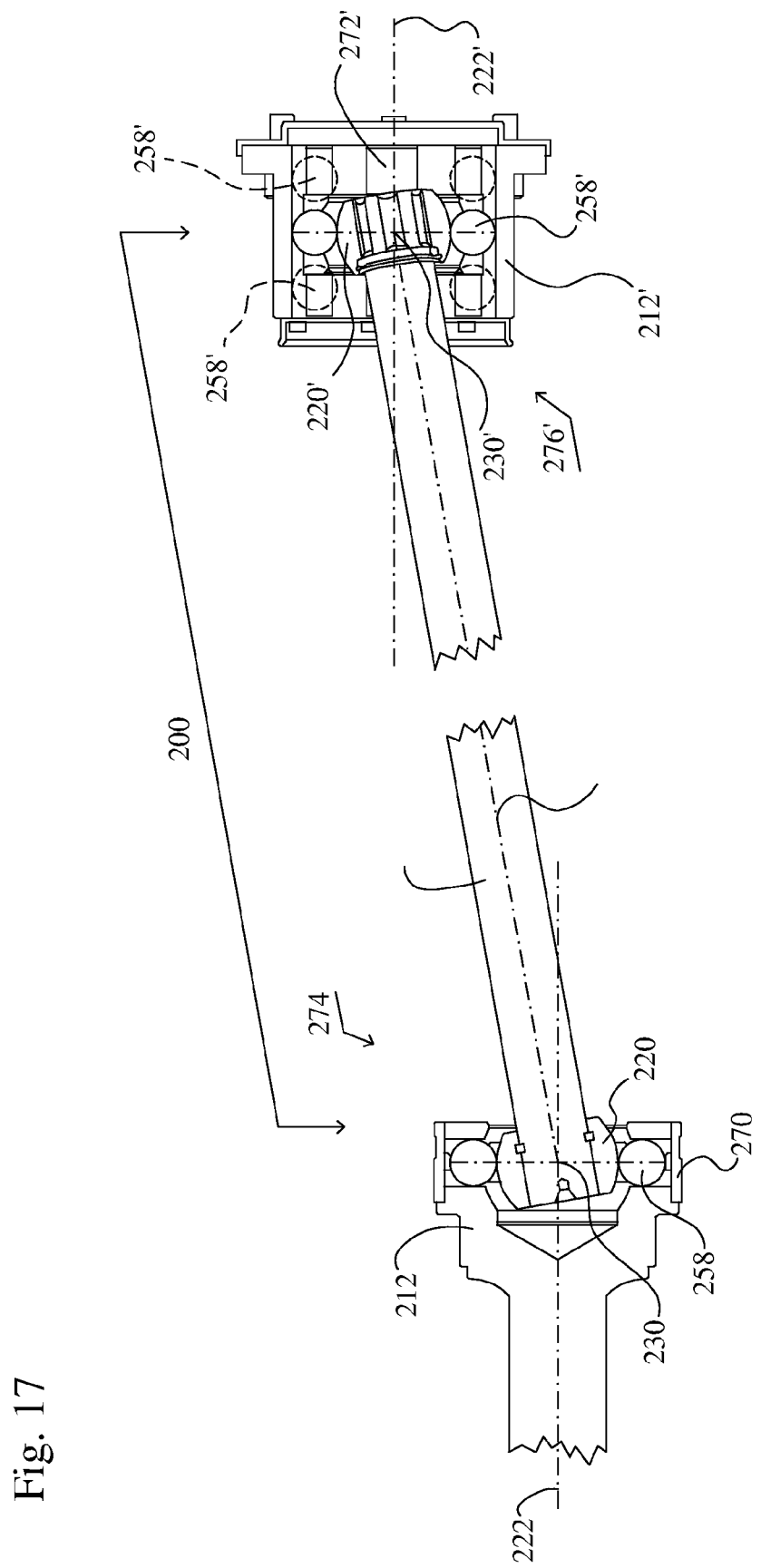
FIG. 17 is a schematic representation of portions of the half-shaft shown in FIG. 15, replacing the CV-joint at the outer end of the half-shaft with the embodiment disclosed in FIG. 11, and replacing the CV-joint and slider at the inner end of the half-shaft with the embodiment disclosed in FIG. 12.

FIG. 17 illustrates another half-shaft 200 that, while similar to half-shaft 100 of FIG. 15, incorporates the two ball-tooth embodiments of the invention described above. Namely, these two different embodiments are positioned, respectively, at the opposite ends of a shaft 216'. Again, while not illustrated in this schematic illustration, it is assumed that the outer end of half-shaft 200 (the left end in the drawing) is attached to a steering drive wheel mounted on the front of a vehicle in a manner well known in the art, that the inner end of half-shaft 200 (the right end in the drawing) is attached to a differential, and that the steering drive wheel has freedom of movement throughout a continuum of angular orientations relative to the differential to permit the drive wheel to turn for steering and to move up and down in response to terrain changes.

Outer ball-tooth spherical-gear CV-joint 274 and inner ball-tooth spherical-gear CV-joint 276' are illustrated with their respective axes 222, 222' intersecting the axis 224' of shaft 216' at approximately 10°. However, as indicated above, preferred embodiments of outer CV-joint 274 can transfer constant velocity rotation up to in all directions away from the position of axis 222 (maximum range of 60°), and in preferred embodiments inner CV-joint 276' can transfer constant velocity rotation ≧20°-30° in all directions away from the position of axis 222' (maximum range of ≧40°-60°). [NOTE: At the present time, outer CV-joints of commercial half-shafts are limited to a maximum range of 52°, while inner CV-joints of commercial half-shafts are limited to a maximum range of 23°.]

Attention is also called to the fact that the diameters of the cup-like supports 212, 212' of both embodiments of the just-disclosed CV-joints are identical so that the boot apparatus used to protect the moving parts of both CV-joints can be identical, providing a significant saving in manufacturing, inventory, and service costs. Further, and perhaps more importantly, these greater-range CV-joints have less size and weight, and they can be manufactured and assembled at lower cost than present commercially-available CV-joints.

Half-shaft 100 (FIG. 15) and half-shaft 200 (FIG. 17) have many significant advantages over present commercially-available half-shafts:

(1) The ball retainer and ball set of present commercial CV-joints, used as a motion-transmission link between female slot sets, is replaced by the invention's direct-driven male/female geometry of spherical-gear couplings with favorable rolling action between elements, thereby (a) significantly reducing sliding action and the associated heat and wear caused by such sliding, (b) eliminating the need to grind very difficult internal curvilinear or skewed grooves in the CV-housing cups, (c) eliminating the need for separate ball retainers with their difficult internal and external spherical grinds as well as precise ball-slot grinding, and (d) thus also eliminating the need for cam-action slot modifications to position a separate ball retainer properly.

(2) The number of parts in each spherical-gear CV-joint of the invention is fewer, and the parts are less complex and not as expensive to manufacture or assemble.

(3) Respective half-shafts 100, 200 each have substantially identical couplings at both ends, thereby simplifying manufacture requiring fewer different parts for manufacture and replacement inventories.

(4) Since the teeth of the spherical gears in the CV-joints of the invention are only in contact at the respective poles, the frictional resistance to rotation at all angles of orientation is remarkably less than that in conventional half-shafts, thus reducing the torque required to turn half-shafts 100, 200 during changes of angular orientation, simplifying assembly, and increasing drive train efficiency.

(5) Lubrication of half-shafts 100, 200 is facilitated by the rolling motion of the spherical gear teeth as they move in and out of mesh twice in every revolution, and the relatively low friction of the mesh permits the use of less expensive lubricants.

Although the spherical gears of the present invention have been described as having a preferred predetermined maximum angle of 30°, a spherical gear may have a predetermined maximum angle of less than 30° or greater than 30° within the spirit of the present invention. Tooth shape for the exterior teeth of the second gear of each pair of spherical gears changes as a function of the predetermined maximum angle, as shown in FIG. 5C and as described above.

The spherical gear designs described and claimed herein provide a significant improvement in the art of automotive CV-joints, universal couplings, and half-shafts.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A universal coupling for interconnecting a first element and a second element rotatable about respective axes that intersect at varying angles, said coupling comprising:
   a single pair of spherical gears comprising:
      a first gear fixed to said first element for rotation therewith and comprising a plurality of internal teeth, each internal tooth having an internal tooth face formed with a lengthwise curvature having only a circular shape; and
      a second gear fixed to said second element for rotation therewith and comprising a plurality of external teeth matingly meshing with said internal teeth, each external tooth having an external tooth face formed with a cylindrical central portion having a predetermined radius and also having two flat face extensions of a predetermined width formed, respectively, on each side of said cylindrical central portion;
   each of said gears having a respective pitch surface in the form of a respective large theoretical pitch sphere, said large pitch spheres being concentric and having radii which are substantially identical, the pitch circle of each of said gears being a great circle on one of said respective large pitch spheres and said pitch circles effectively intersecting with each other at two pole points separated by 180°;
   each respective tooth of said gears being formed within one of a plurality of individual smaller theoretical spheres arranged in a circle so that each successive smaller theoretical sphere is tangent to the next smaller theoretical sphere at points of contact falling on the surface of said large pitch spheres, the distance between said points of contact on each smaller sphere defining the normal chordal thickness of each respective tooth; and
   the axes of said elements intersecting at the center of said large pitch spheres at all times when said gears are rotating in a driving and driven relationship as said axes variably intersect throughout a continuous range from 180° to an angle differing from 180° by a predetermined maximum angle x° so that said elements intersect over a continuous maximum range of 2x°;
   wherein the surface of each said internal tooth face is tangent to its respective individual smaller sphere at said points of contact shared between said smaller spheres, and wherein the circular shape of the lengthwise curvature of each said internal tooth face is either:
      i) spherical having a diameter equal to the diameter of at least one half of each of said respective individual smaller spheres; or
      ii) conical having a cone vertex angle determined by a construct including:
         a) said smaller theoretical spheres plus a further smaller theoretical sphere of equal size positioned centrally concentric to said two large theoretical spheres; and
         b) two crossing lines constructed tangent to opposite sides of said smaller central sphere and passing through a respective one of the two points of tangency that one of said smaller theoretical spheres shares with its neighboring spheres;
      said cone vertex angle being determined by an included angle formed at a point of intersection by said intersecting lines.

2. The universal coupling of claim 1, wherein x is at least 30.

3. The universal coupling of claim 1, wherein an internal portion of each said internal tooth and each said external tooth is hollowed.

4. The universal coupling of claim 1, wherein the universal coupling is fixedly mounted back-to-back to a second universal coupling substantially identical to said universal coupling to provide a continuous maximum range of motion of 4x° between said first or second element and a third element extending from said second universal coupling.

5. The universal coupling of claim 1, wherein each internal tooth extends perpendicularly to the axis of said first element, and wherein each external tooth extends perpendicular to the axis of said second element so that each tooth face of the teeth of each gear is centered on a great circle of the respective large sphere that is the pitch sphere of each gear, the axis of each said great circle being aligned at all times with the axis of each respective element.

6. The universal coupling of claim 5, wherein there are twelve individual smaller spheres such that each said gear has six teeth, and wherein each said internal tooth is a ball having the same diameter as at least one-half of said respective individual smaller spheres.

7. The universal coupling of claim 6, wherein each said internal ball tooth is supported within a cup-like support fixed to an end of said first element so that the face of each respective ball tooth remains centered at all times in the plane of the great circle of said respective large sphere of said first gear.

8. The universal coupling of claim 7, wherein said cup-like support further comprises a core housing having a spherical surface; wherein each said external tooth is mounted on a hub portion attachable to an end of said second element; and wherein the top lands of said external teeth are spherical surfaces that mate with said spherical surface of the core housing to permit angular movement in any direction from 180° up to the predetermined maximum angle x°.

9. The universal coupling of claim 8, wherein said internal and external teeth are in mesh simultaneously at each of said respective pole points separated by 180°.

10. The universal coupling of claim 9, wherein respective pairs of said internal and external teeth are successively in mesh so that a second one of said pairs enters mesh before the prior pair leaves mesh at all times at all angles as said elements variably intersect over said continuous range of angles.

11. Two universal couplings according to claim 10, comprising a first universal coupling and a second universal coupling, attached, respectively, to the ends of an automotive half-shaft.

12. The universal couplings of claim 11, wherein said hub portion of each said respective coupling is attached, respectively, to one end of said automotive half-shaft.

13. The universal couplings of claim 12, wherein the cup-like support of said first universal coupling is connectable to an automotive differential, and the cup-like support of said second universal coupling is connectable to an automotive drive wheel.

14. The universal couplings of claim 11 further comprising a slider positioned intermediate said universal couplings, the overall length of said slider changing to compensate for the differing distances between said drive wheel and said differential due to the relative movement of said drive wheel.

15. The universal couplings of claim 11, wherein the cup-like support of one of said couplings is extended axially and the spherical core housing is slidably mounted for axial movement within the support to compensate for the differing distances between said drive wheel and said differential due to the relative movement of said drive wheel.

16. The universal couplings of claim 15, wherein said slider comprises a first member having at least one roller and a second member having a track for matingly receiving said roller, whereby the movement of said slider along said roller changes the overall length of said slider to compensate for the differing distances between said drive wheel and said differential due to the relative movement of said drive wheel.

17. The universal coupling of claim 1, wherein said predetermined width of said flat face extensions of each said external tooth face varies in accordance with said maximum angle x°, said extensions being formed to each side of a tooth face center from initial tangent points located x° from the center line of said tooth face center and extending at least to a radial line of said cylindrical central portion measuring 2x°, such that the length of each flat portion on each side of said tooth face center extends an additional x° beyond said tangent point of x°, and wherein each said flat face extension extends from said initial tangent points parallel to the line of movement of the radial center of said cylindrical central portion as said second gear moves along an elliptical arc relative to said first gear when the axes of the gears are intersecting at said maximum angle x°.

18. The universal coupling of claim 1, wherein said predetermined radius of the cylindrical central portion of each external tooth face is equal to one-half said normal chordal thickness of each respective external tooth.

19. The universal coupling of claim 1, wherein said plurality of individual smaller spheres is twelve in number such that each said gear has six teeth, and wherein each said internal tooth face is conical and formed within a cup-like support fixed to an end of said first element, and further comprising a centering ball mounted within said cup-like support, said centering ball having a radius no greater than the distance between said concentric centers of said large pitch spheres and said point of intersection.

20. The universal coupling of claim 19, wherein the contact pattern shared by said pairs of internal and external teeth in mesh is a full line contact throughout all said variable angles, said lines of contact moving across the full tooth faces of said respective gears as the angles of intersection vary throughout said continuous range.

21. The universal coupling of claim 1, wherein each said internal tooth is formed within a cup-like support fixed to an end of said first element.

22. The universal coupling of claim 21, wherein each said internal tooth is individually formed and press-fitted into said cup-like support.

23. The universal coupling of claim 21, wherein a centering ball is mounted in said cup-like support.

24. The universal coupling of claim 21, wherein each said external tooth is mounted on a hub attachable to an end of said second element.

25. The universal coupling of claim 24, wherein said hub is matingly fitted over said cup-like support for angular movement in any direction from 180° up to the predetermined maximum angle x°.

26. A single pair of spherical gears for interconnecting a first element and a second element rotatable about respective axes that intersect at varying angles, said gears comprising:
a first gear fixed to said first element for rotation therewith and comprising a plurality of internal teeth, each internal tooth having an internal tooth face formed with a lengthwise curvature having only a circular shape; and
a second gear fixed to said second element for rotation therewith and comprising a plurality of external teeth matingly meshing with said internal teeth, each external tooth having an external tooth face formed with a cylindrical central portion having a predetermined radius and also having two flat face extensions of predetermined width formed, respectively, on each side of said cylindrical central portion;
each of said gears having a respective pitch surface in the form of a respective large theoretical pitch sphere, said large pitch spheres being concentric and having radii which are substantially identical, the pitch circle of each of said gears being a great circle on one of said respective large pitch spheres and said pitch circles effectively intersecting with each other at two pole points separated by 180°;
each respective tooth of said gears being formed within one of twelve individual smaller theoretical spheres arranged in a circle so that each successive smaller theoretical sphere is tangent to the next smaller theoretical sphere at points of contact falling on the surface of said large pitch spheres, the distance between said points of contact on each smaller sphere defining the normal chordal thickness of each respective tooth; and
the axes of said elements intersecting at the center of said large pitch spheres at all times when said gears are rotating in a driving and driven relationship as said axes variably intersect throughout a continuous range from 180° to an angle differing from 180° by a predetermined maximum angle x° so that said elements intersect over a continuous maximum range of 2x°.

27. The gears of claim 26, wherein each said internal tooth is a ball having the same diameter as at least one-half of said respective individual smaller spheres.

28. The gears of claim 27, wherein the internal ball teeth are mounted in a core housing within a cup-shaped support, and the external teeth are mounted on a hub, the top lands of the external teeth having a spherical shape that matingly engages a spherical surface formed on said core housing when the teeth of the spherical gears mesh.

29. The gears of claim 28, wherein each internal ball tooth is retained within an individual aperture in the core housing so that the spherical face of each internal tooth remains centered at all times on the pitch circle of the first gear.

30. The gears of claim 29, wherein each internal ball tooth is maintained within said aperture by a retainer.

31. The gears of claim 29, wherein said cup-shaped support is extended axially and maintains each internal ball tooth within the respective apertures of said core housing, permitting the ball teeth to roll to allow axial movement of the core housing within the cup-shaped support while the tooth face of each internal ball tooth remains centered at all times on a great circle of the respective large sphere that is the pitch sphere of said first gear, the axis of said great circle being aligned at all times with the axis of said first element.

* * * * *